(12) United States Patent
Torigoe et al.

(10) Patent No.: US 11,743,341 B2
(45) Date of Patent: Aug. 29, 2023

(54) MULTI-AGENT SIMULATION SYSTEM AND METHOD

(71) Applicant: TOYOTA JIDOSHA KABUSHIKI KAISHA, Toyota (JP)

(72) Inventors: Takatomo Torigoe, Yokohama (JP); Akira Yoshioka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/662,164

(22) Filed: May 5, 2022

(65) Prior Publication Data

US 2022/0394094 A1 Dec. 8, 2022

(30) Foreign Application Priority Data

Jun. 8, 2021 (JP) ................................. 2021-095953

(51) Int. Cl.
*H04L 15/16* (2006.01)
*H04L 67/131* (2022.01)
*H04L 47/283* (2022.01)

(52) U.S. Cl.
CPC .......... *H04L 67/131* (2022.05); *H04L 47/283* (2013.01)

(58) Field of Classification Search
CPC ... H04L 67/131; H04L 67/1396; H04L 47/28; H04L 47/283
USPC ................................. 709/206–207, 225–226
See application file for complete search history.

(56) References Cited

U.S. PATENT DOCUMENTS

| | | | | |
|---|---|---|---|---|
| 2005/0095572 | A1* | 5/2005 | Comer ..................... | G09B 7/02 434/362 |
| 2011/0161063 | A1* | 6/2011 | Pye ....................... | G06F 11/3696 715/752 |
| 2012/0203528 | A1 | 8/2012 | Ikeda et al. | |
| 2016/0132778 | A1* | 5/2016 | Hayashi .................. | G06F 30/20 706/46 |
| 2016/0189558 | A1* | 6/2016 | McGann ............... | G06Q 30/016 434/219 |
| 2021/0104171 | A1* | 4/2021 | White ...................... | G06N 3/08 |
| 2021/0374310 | A1* | 12/2021 | Basin ...................... | G06F 30/20 |
| 2022/0130546 | A1* | 4/2022 | Wei ......................... | G06N 3/045 |

(Continued)

FOREIGN PATENT DOCUMENTS

| | | |
|---|---|---|
| JP | 2004272693 A | 9/2004 |
| JP | 2015022378 A | 2/2015 |
| WO | 2011018854 A1 | 2/2011 |

*Primary Examiner* — Bharat Barot
(74) *Attorney, Agent, or Firm* — Dickinson Wright, PLLC

(57) ABSTRACT

The multi-agent simulation system includes a plurality of agent simulators provided for each of the plurality of agents and a center controller. The plurality of agent simulators are programmed to simulate a state of each of the plurality of agents while causing the plurality of agents to interact with each other by exchanging messages. The center controller is programmed to control a speed ratio of a flow of time in the target world to a flow of time in a real world. Each of the plurality of agent simulators calculates an index value corresponding to a remainder time rate. The remainder time rate is a rate of a remainder time to an update time interval for updating a state of a target agent to be simulated. The center controller controls the speed ratio based on the index value calculated by each of the plurality of agent simulators.

14 Claims, 18 Drawing Sheets

(56) References Cited

U.S. PATENT DOCUMENTS

2022/0156432 A1\* 5/2022 Best .................. G06F 30/20
2023/0035281 A1\* 2/2023 Reshef ................ G06N 3/08

\* cited by examiner

MULTI-AGENT SIMULATION SYSTEM AND METHOD

CROSS-REFERENCE TO RELATED APPLICATION

The present application claims priority under 35 U.S.C. § 119 to Japanese Patent Application No. 2021-095953, filed Jun. 8, 2021, the contents of which application are incorporated herein by reference in their entirety.

BACKGROUND

Field

The present disclosure relates to a multi-agent simulation system and a multi-agent simulation method for simulating a target world using a plurality of agents interacting with each other.

Background Art

Multi-agent simulation is known. The multi-agent simulation is to simulate a target world using a plurality of agents interacting with each other. For example, JP2015-022378A discloses a prior art of changing a time interval for notifying other agents of an agent status in multi-agent simulation. In the prior art, for example, when there is little change in information, the frequency of notification is reduced to speed up the simulation.

As documents showing the state of the art as of the filing of the present application in the technical field of the present disclosure, WO-2011/018854 and JP2004-272693A can be exemplified in addition to JP2015-022378A.

SUMMARY

The progress of time in a target world to be simulated does not necessarily have to be the same as the progress of time in the real world. By making the progress of the time in the simulation faster than that in the real world, the simulation can be proceeded at high speed. However, the speed of the simulation that can be realized depends on a computing/networking environment.

In multi-agent simulation, the interaction between agents is accomplished by the exchange of messages. If the sum of the calculation time at each agent and the time required to exchange messages falls within the time granularity set for each agent, the accuracy of the simulation for each agent can be maintained.

However, if the computing/networking environment is poor, messages from other agents may not arrive until the processing timing required, or, conversely, future messages may arrive from other agents prior to transmitting messages to other agents. In other words, if the computing/networking environment is poor, the speed of the simulation may be too fast, which may result in agents whose processing time in the target world does not fall within the time granularity. In such a case, the accuracy of the simulation in the target world is naturally reduced.

On the other hand, when the speed of the simulation is slower than that expected from the computing/networking environment, each agent can perform calculation and message exchange with sufficient margin. In other words, if the computing/networking environment is too good, the processing time in the target world will be extremely short with respect to the time granularity, resulting in a waiting time in which each agent waits without any action. The greater the waiting time, the greater the waste of resources.

The present disclosure has been made in view of the above-described problems. It is an object of the present disclosure to provide a multi-agent simulation system and method capable of executing a simulation at high speed while maintaining the accuracy of the simulation.

The present disclosure provides a multi-agent simulation system that simulates a target world using a plurality of agents interacting with each other. The system of the present disclosure comprises a plurality of agent simulators provided for each agent of the plurality of agents and a center controller programmed to control a speed ratio of a flow of time of the target world to a flow of time of a real world. The plurality of agent simulators are programmed to simulate a state of each of the plurality of agents while causing the plurality of agents to interact with each other by exchange of messages. Each of the plurality of agent simulators is programmed to calculate an index value corresponding to a remainder time rate, the remainder time rate being a rate of a remainder time to an update time interval for updating a state of a target agent to be simulated, the remainder time being a time between the update time interval and a processing time for updating processing. The center controller is programmed to control the speed ratio based on the index value calculated by each of the plurality of agent simulators.

In the system of the present disclosure, the center controller may be programmed to control the speed ratio based on an index value having a lowest corresponding remainder time rate among index values calculated by the plurality of agent simulators. Theirs makes it possible to accelerate the simulation speed in a situation where there is a margin in the remainder time rate, proceeding the simulation at high speed.

In the system of the present disclosure, the center controller may be programmed to increase the speed ratio in a case where the index value corresponds to a remainder time rate equal to or greater than a first threshold value. Thais makes it possible to accelerate the simulation speed in a situation where there is a margin in the remainder time rate, proceeding the simulation at high speed. Further, the center controller may be programmed to increase the speed ratio more as a remainder time rate that the index value corresponds to is higher. This makes it possible to accelerate the simulation speed more greatly as the margin in the remainder time rate is greater.

In the system of the present disclosure, the center controller may be programmed to decrease the speed ratio in a case where the index value corresponds to a remainder time rate equal to or less than a second threshold value that is lower than the first threshold value. This makes it possible to decelerate the simulation speed in a situation where there is little margin in the remainder time rate, suppressing a decrease in the accuracy of the simulation. Incidentally, the second threshold value is a value greater than zero. Further, the center controller may is programmed to decrease the speed ratio more as a remainder time rate that the index value corresponds to is closer to zero. This makes it possible to decelerate the simulation speed more greatly as the margin in the remainder time rate is smaller.

In the system of the present disclosure, each of the plurality of agent simulators may be programmed to calculate, as the index value, a ratio of a remainder time from an acquisition time of a last received message among messages from other agent simulators necessary for a next update of the state of the target agent to a next update time of the state of the target agent to the update time interval. Since the update time of the state is known each time, it is possible to calculate the index value as long as there is only the acquisition time of the last received message among messages from other agent simulators.

The present disclosure provides a multi-agent simulation method for simulating a target world using a plurality of agents interacting with each other. The method of the present disclosure comprises exchanging messages between a plurality of agent simulators provided for each of the plurality of agents and simulating a state of each of the plurality of agents while causing the plurality of agents to interact with each other by exchange of the messages. The method of the present disclosure also comprises controlling a speed ratio of a flow of time of the target world to a flow of time of a real world by a center controller. Further, the method of the present disclosure comprises causing each of the plurality of agent simulators to calculate an index value corresponding to a remainder time rate, the remainder time rate being a rate of a remainder time to an update time interval for updating a state of a target agent to be simulated, the remainder time being a time between the update time interval and a processing time for updating processing. In the method of the present disclosure, the controlling the speed ratio includes controlling the speed ratio based on the index value calculated by each of the plurality of agent simulators.

In the method of the present disclosure, the controlling the speed ratio may include controlling the speed ratio based on an index value having a lowest corresponding remainder time rate among index values calculated by the plurality of agent simulators.

In the method of the present disclosure, the controlling the speed ratio includes increasing the speed ratio in a case where the index value corresponds to a remainder time rate equal to or greater than a first threshold value. Further, the controlling the speed ratio may include increasing the speed ratio more as a remainder time rate that the index value corresponds to is higher.

In the method of the present disclosure, the controlling the speed ratio may include decreasing the speed ratio in a case where the index value corresponds to a remainder time rate equal to or less than a second threshold value that is lower than the first threshold value and greater than zero. Further, the controlling the speed ratio may include decreasing the speed ratio more as a remainder time rate that the index value corresponds to is closer to zero.

In the method of the present disclosure, the causing each of the plurality of agent simulators to calculate the index value may include causing each of the plurality of agent simulators to calculate, as the index value, a ratio of a remainder time from an acquisition time of a last received message among messages from other agent simulators necessary for a next update of the state of the target agent to a next update time of the state of the target agent to the update time interval.

In the multi-agent simulation system and method of the present disclosure, when the flow of time of the target world is fast relative to the computing/networking environment where the simulation is executed, the remainder time rate, which is the rate of the remainder time to the update time interval, is decreased. Conversely, when the flow of time of the target world is slow relative to the computing/networking environment, the remainder time rate is increased. According to the multi-agent simulation system and method of the present disclosure, the speed ratio of the flow of time of the target world to the flow of time of the real world is controlled based on the index value corresponding to the remainder time rate, which is calculated by each of the plurality of agent simulators. This automatically optimizes the speed ratio and makes it possible to execute the simulation as fast as possible while maintaining the accuracy of the simulation.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly designated by the numerals theoretically. Furthermore, structures and processes that are described in the embodiments shown as follows are not always indispensable to the disclosure unless specially explicitly shown otherwise, or unless the disclosure is explicitly designated by the structures or the processes theoretically.

1. Overview of Multi-Agent Simulation System

Figure 1:
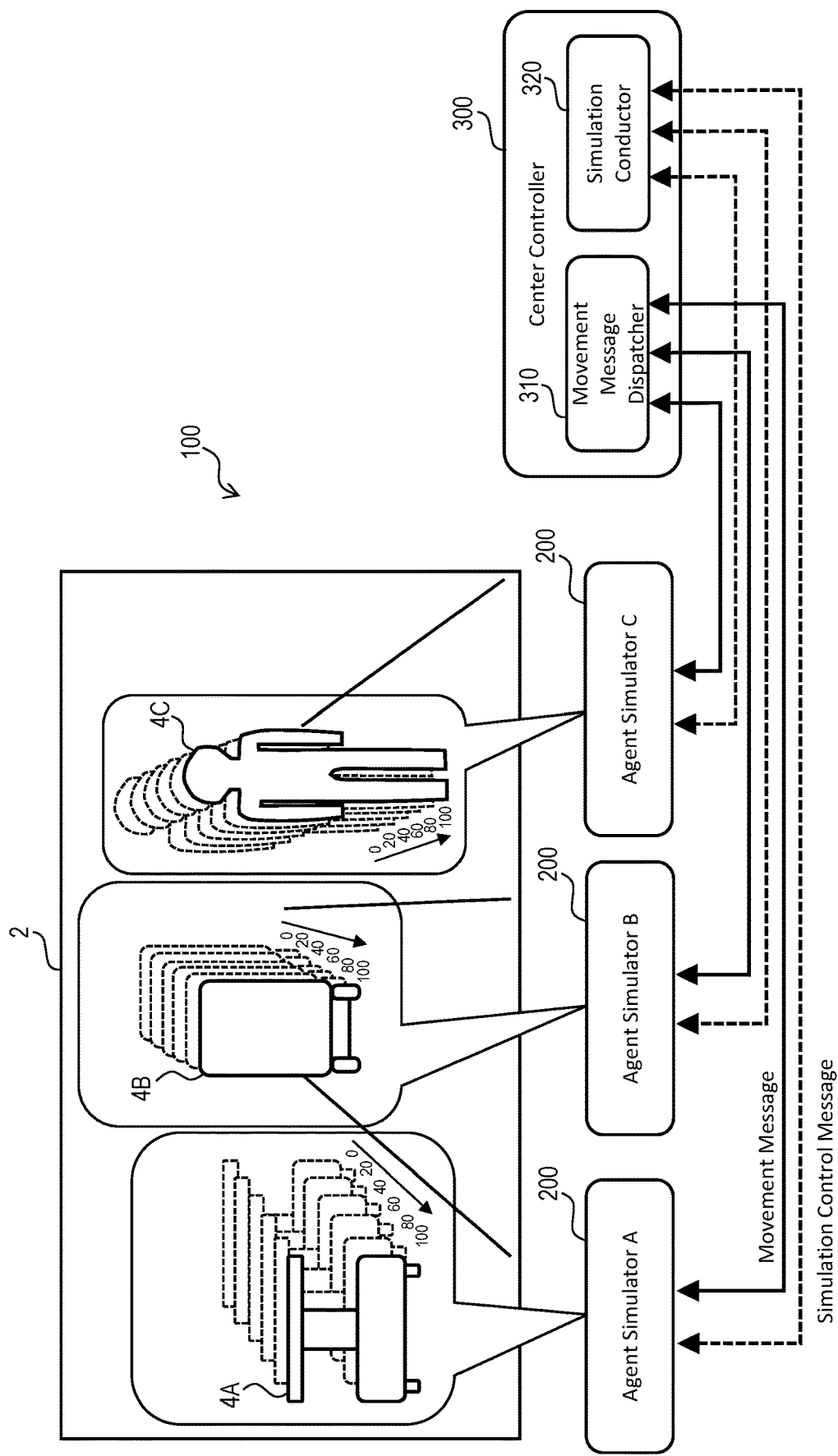
FIG. 1 is a diagram illustrating an overview of a multi-agent simulation system according to an embodiment of the present disclosure.
Figure 2:
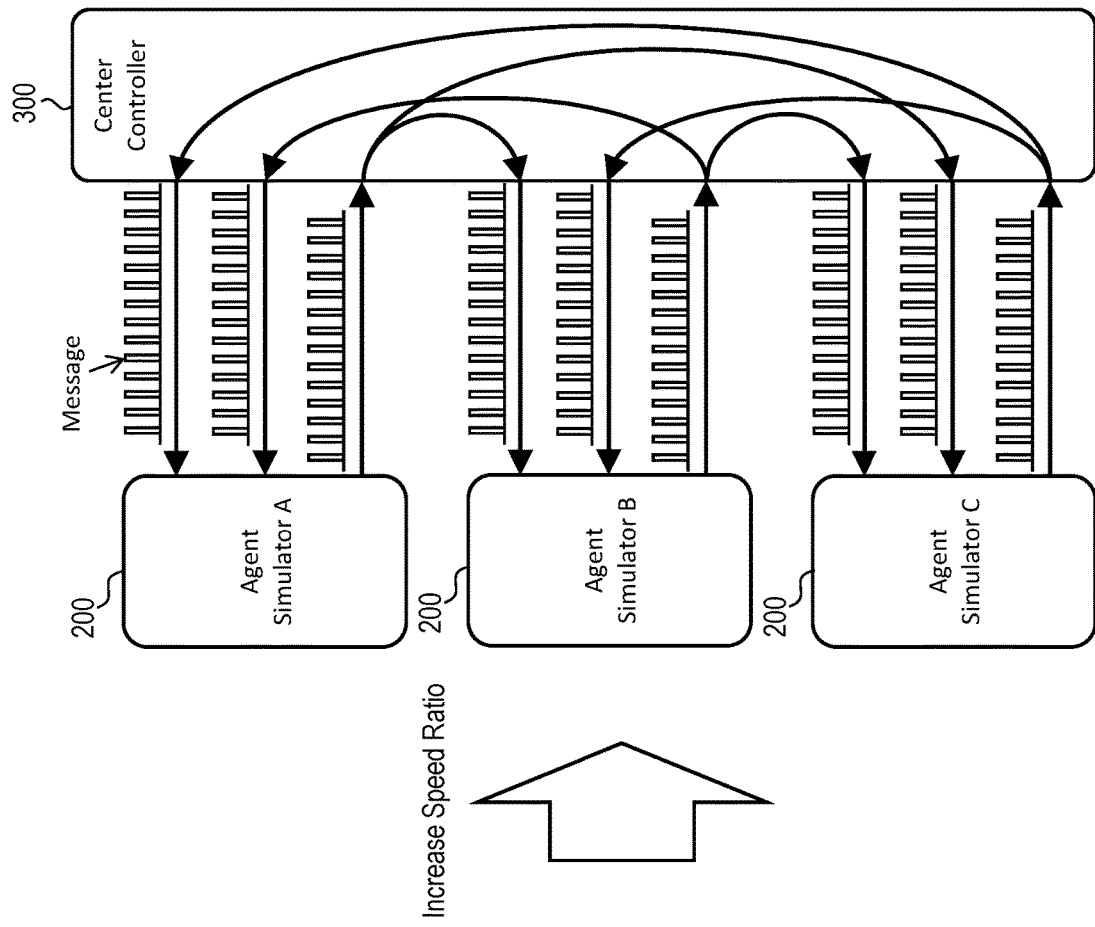
FIG. 2 is a diagram illustrating the overview of the multi-agent simulation system according to the embodiment of the present disclosure.
Figure 2:
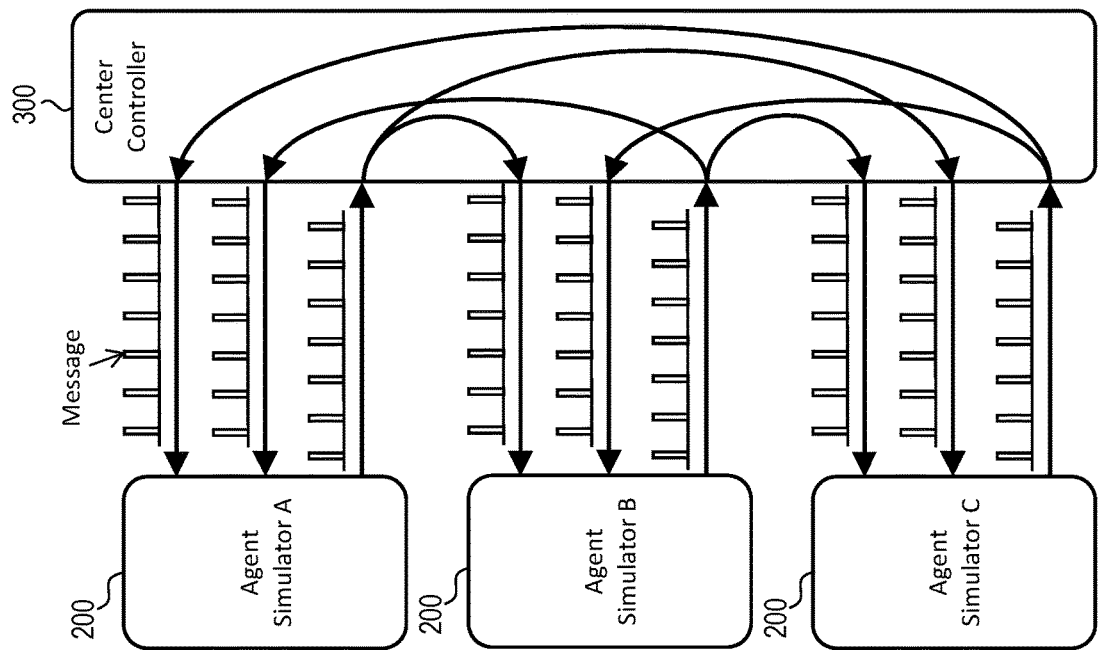
Figure 3:
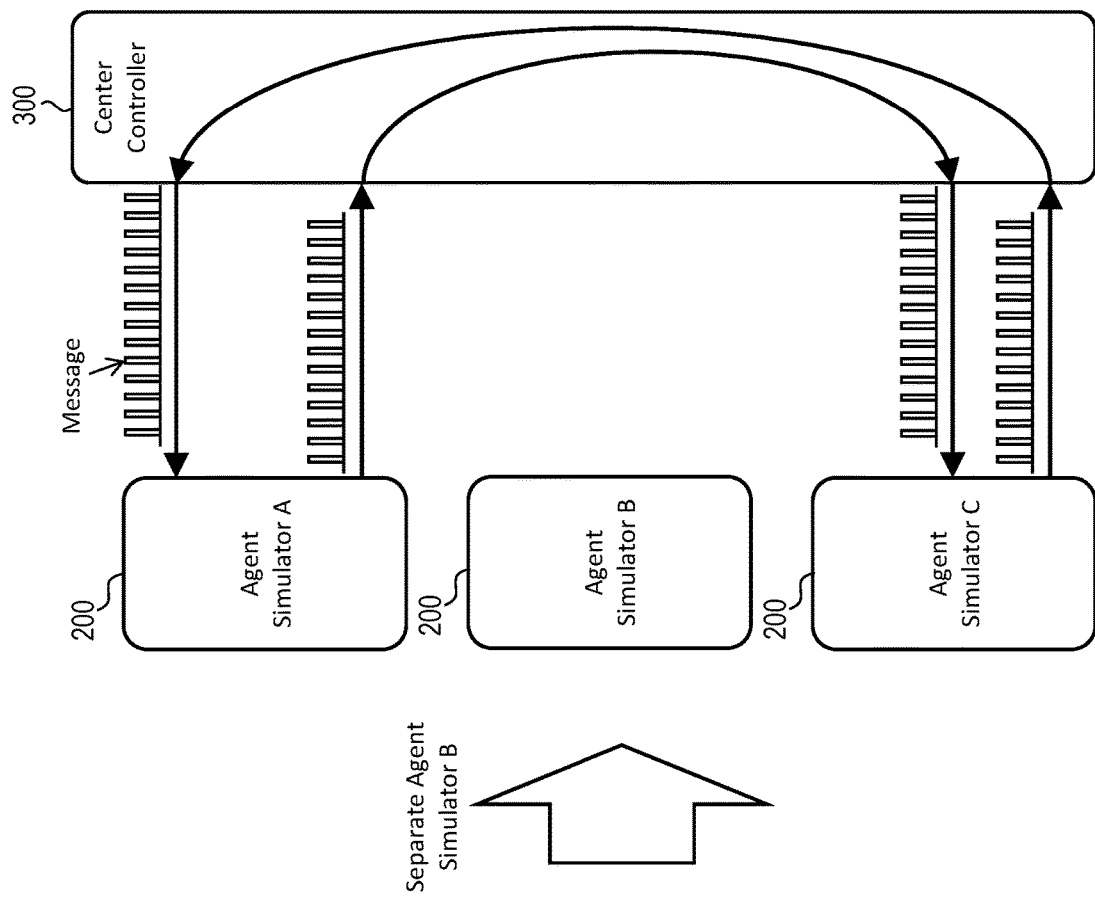
FIG. 3 is a diagram illustrating the overview of the multi-agent simulation system according to the embodiment of the present disclosure.
Figure 3:
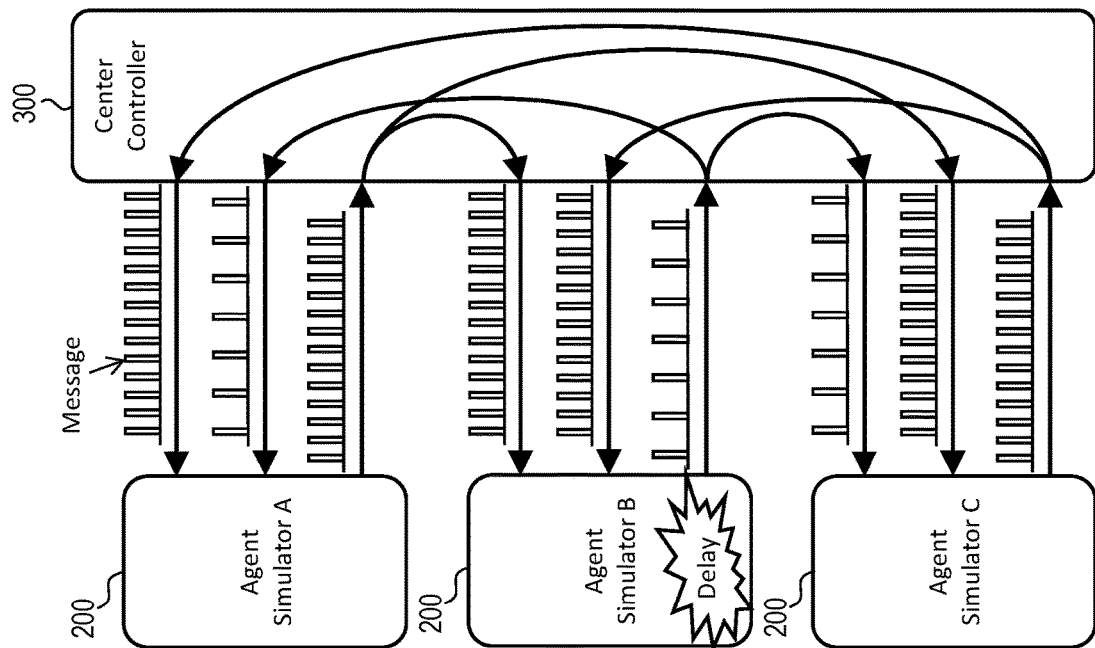

Referring to FIGS. 1 to 3, an overview of a multi-agent simulation system according to an embodiment of the present disclosure will be described. Hereafter, the multi-agent simulation system is abbreviated as the MAS system.

1-1. Overview of Configuration and Functions of MAS System

FIG. 1 shows a schematic configuration of the MAS system 100 of the present embodiment. The MAS system 100 simulates a world (simulation target world) 2 which is the target of simulation by causing a plurality of agents 4A, 4B, 4C to interact with each other. The simulation target world by the MAS system of the present disclosure is not limited. However, the simulation target world 2 of the MAS system 100 of the present embodiment is a world in which a person coexists with an autonomous mobile, for example, a robot or a vehicle and can receive various services using the autonomous mobile. The services provided in the simulation target world 2 include, for example, mobility services such as on-demand buses and ferry type buses using autonomous traveling vehicles, and logistics services for delivering packages using autonomous mobile robots.

The simulation target world 2 is comprised of a large number of and many types of agents. The agents comprising the simulation target world 2 include an agent representing a moving object and an agent representing a non-moving object. Examples of moving objects represented as agents are pedestrians, robots, low-speed mobiles, vehicles, pedestrians in which real people participate using VR systems, elevators, etc. Examples of non-moving objects represented as agents are sensors including a camera, automatic doors, etc.

However, in FIG. 1, only three agents 4A, 4B, 4C are shown in the simulation target world 2 for the purpose of illustration. Of these, the agents 4A, 4B represent robots, and the agent 4C represents a pedestrian. That is, in the simulation target world 2 shown in FIG. 1, two types of agents robot and pedestrian are represented. Although the agent 4A and the agent 4B belong to the same category of robot, they differ in size, shape, traveling speed, and motion. Therefore, there are differences between the agent 4A and the agent 4B in the visual information that the agent 4C, which is a pedestrian, can obtain from them. Hereafter, in this specification, the agent 4A is simply referred to as agent A. Similarly, the agent 4B is simply referred to as agent B, and the agent 4C is simply referred to as agent C. In the following, the simulation target world 2, which is a virtual world, is called the virtual world 2 to distinguish it from the real world.

The MAS system 100 includes a plurality of agent simulators 200. The agent simulator 200 is provided for each agent A, B, C. In the following, when distinguishing each agent simulator 200, the agent simulator 200 that simulates the state of the agent A is referred to as agent simulator A. Similarly, the agent simulator 200 that simulates the state of agents B, C is referred to as agent simulators B, C. Each agent simulator 200 has a different configuration depending on the type of the agent to be targeted. For example, the agent simulators B, C of the robot agents B, C have similar configurations, but the agent simulator A of the pedestrian agent A has a different configuration from the agent simulators B, C. The configuration of the agent simulator 200 for each agent type will be described in detail later.

The agent simulator 200 simulates the state of each agent A, B, C while causing them to interact with each other by the exchange of messages. The messages exchanged between the agent simulators 200 contain movement information, which is information on the location and movement of the agent within the virtual world 2. The movement information includes information on the current state and the future plan for the location and movement of the agent. The Information on the current state is, for example, the location, direction, speed, and acceleration at the current time. The Information on the future plan is, for example, a list of locations, directions, speeds, and accelerations at future times. Hereinafter, messages relating to the location and movement of agents exchanged between the agent simulators 200 are referred to as movement messages.

The agent simulator 200 calculates the state of the target agent (ego-agent) to be simulated based on the states of surrounding agents. The surrounding agents are interactive agents that exist around the ego-agent and interact with the ego-agent. The information representing the states of the surrounding agent is movement messages. Each agent simulator 200 can grasp the states of the surrounding agents by exchanging movement messages with other agent simulators 200.

In the example shown in FIG. 1, the agent simulator A grasps the states of the agents B and C from movement messages received from the agent simulators B and C, and updates the states of the agents A based on the states of the agents B and C. The agent simulator A transmits a movement message representing the updated state of the agent A to the agent simulators B and C. Similar processing is also performed in the agent simulators B and C. Thus, the states of the agents A, B, and C are simulated while the agents A, B, and C interact with each other.

The update method of the state of the agent by the agent simulator 200 includes a method of updating the state at regular time intervals and a method of updating the state when some event is detected. However, the latter method also forces an event to be generated to update the state at regular intervals because the effect on the surrounding agents is large if the state is not updated too long. The time interval between agent state updates by the agent simulator 200 is called time granularity.

In the example shown in FIG. 1, the time granularity of each agent A, B, C in the virtual world 2 is set to 20 msec. However, it is possible to change the time granularity according to the agent type. For example, since the pedestrian agent C is slower in motion compared to the robot agents A, B, the time granularity of the pedestrian agent C may be greater than the time granularity of the robot agents A, B. Each agent simulator A, B, C executes the simulation with a control cycle corresponding to the time granularity of the agents A, B, C that they are in charge of.

In the MAS system 100, the simulation is performed by the exchange of movement messages between the agent simulators 200. However, the exchange of movement messages for the simulation is not performed directly between agent simulators 200. The MAS system 100 includes a center controller 300 that communicates with the agent simulators 200. The center controller 300 includes a movement message dispatcher 310 for distributing the received movement messages. Movement messages are relayed by the movement message dispatcher 310 and exchanged between the agent simulators 200.

In the example shown in FIG. 1, a movement message output from the agent simulator A is received by the movement message dispatcher 310. The movement message dispatcher 310 transmits the movement message of the agent simulator A to the agent simulators B, C. Similarly, the movement message of the agent simulator B is transmitted to the agent simulators A, C by the movement message dispatcher 310, and the movement message of the agent simulator C is transmitted to the agent simulators A, B by the movement message dispatcher 310.

The speed at which movement messages are exchanged between the agent simulators 200 is initially set such that the time granularity set for each agent matches the time interval in the real world. In other words, according to the initial setting of the exchange speed of movement messages, the flow of time in the virtual world 2 is consistent with the flow of time in the real world. When the exchange speed of movement messages is increased from such an initial state, the speed ratio of the flow of time in the virtual world 2 to the flow of time in the real world increases. The exchange speed of movement messages depends on the time interval at which movement messages are transmitted from each agent simulator 200. For example, when the transmission interval of movement messages is halved, the exchange speed of mobile messages is doubled. When the exchange speed of movement messages is doubled, the operation speed of agents also becomes doubled, thereby the simulation progresses twice as fast. That is, the exchange speed of movement messages means the simulation speed.

Here, if each agent simulator 200 independently changes the transmission interval of movement messages, there may be deviation in the operating speed between the ego-agent and surrounding agents. In addition, there is a possibility that information on the states of surrounding agents cannot be obtained when the state of the ego-agent is updated, or that information on the state of the ego-agent cannot be transmitted when the states of surrounding agents are updated, causing the simulation to fail. Therefore, the transmission interval of movement messages must be controlled collectively for all the agent simulators 200.

The transmission interval of movement messages by each agent simulator 200 is controlled by the center controller 300. Specifically, the center controller 300 includes a simulation conductor 320 that controls the simulation by each agent simulator 200.

The simulation conductor 320 controls the simulation by the agent simulator 200 through the exchange of simulation control messages with the agent simulator 200. The simulation conductor 320 communicates with all of the agent simulators 200 comprising the MAS system 100 and exchanges simulation control messages with them. The exchange of simulation control messages is used for controlling, for example, simulation speed, stopping the simulation, pausing the simulation, restarting the simulation, and the time granularity of the simulation. The simulation speed is controlled collectively for all the agent simulators 200. In contrast, stopping the simulation, pausing the simulation, restarting the simulation, and the time granularity of the simulation are controlled for each agent simulator 200.

1-2. Overview of Simulation Speed Control in MAS System

FIGS. 2 and 3 shows an overview of the simulation speed control performed in the MAS system 100. In the MAS system 100, each agent simulator 200 transmits movement message at a time interval corresponding to the time granularity of the agent to be simulated. Assuming that the time granularity of each agent A, B, C is as shown in FIG. 1, each agent simulator 200 transmits movement messages at 20 msec intervals.

When increasing the simulation speed, the center controller 300 (specifically, the simulation conductor 320) increases the speed ratio of the flow of time in the virtual world 2 to the flow of time in the real world by causing each agent simulator 200 to shorten the transmission interval of movement messages. The higher the speed ratio, the higher the simulation speed and the shorter the time it takes to complete the simulation.

However, depending on the computing/networking environment where the agent simulator 200 is operating, there may be an agent simulator 200 that cannot keep up with the flow of time in the virtual world 2. In the example shown in FIG. 3, the transmission interval of movement messages transmitted from the agent simulators A, C has become shorter, but the transmission interval of movement messages transmitted from the agent simulator B has not become shorter. In other words, there is a delay in the agent simulator B.

The agent simulator 200 uses information on the states of surrounding agents to update the state of the ego-agent. In the example shown in FIG. 3, the agent simulator A uses the movement messages transmitted from each of the simulators B, C to update the state of the ego-agent. The agent simulator C uses the movement messages transmitted from each of the simulators A, B to update the state of the ego-agent. Therefore, the delay of the agent simulator B is not only the problem of only the agent simulator B but also the problem affecting the agent simulators A, C exchanging movement messages with the agent simulator B. That is, the presence of the agent simulator B whose processing does not keep up with the flow of time in the virtual world 2 decreases the accuracy of the simulation by the MAS system 100.

Therefore, the center controller 300 (specifically, the simulation conductor 320) separates the agent simulator B, which is delayed, from the simulation. The agent B disappears from the virtual world 2 by separating the agent simulator B from the simulation. As a result, the agent A becomes to interact only with the agent C and can continue the simulation without being affected by the agent simulator B. This prevents the agent simulator B from becoming rate-limiting and makes room for further increasing the simulation speed of the agent simulators A, C.

As described above, in the MAS system 100, the simulation speed is increased by shortening the transmission interval of movement messages between the agent simulators 200, and the delayed agent simulator 200 is separated from the simulation. However, whether or not to separate the simulation depends on the type of agent. For example, even if one of the pedestrian agents in the crowd suddenly disappears from the virtual world 2 due to the separation of the agent simulator 200, the impact on the simulation is negligibly small. On the other hand, if the vehicle agent carrying a passenger suddenly disappears from the virtual world 2 while leaving the passenger, the simulation is not established at that time. In other words, an agent whose presence or absence has a significant effect on the simulation cannot be separated from the simulation. Therefore, the MAS system 100 is required to maintain the simulation speed in an appropriate speed range as well as to reduce the simulation time by acceleration of the simulation speed.

In the MAS system 100, a "remainder time rate" is used as an index value to determine the appropriateness of the simulation speed. The remainder time rate is defined as the ratio of a remainder time to an update time interval at which the agent state is updated. The remainder time is the time obtained by subtracting a processing time for update processing from the update time interval. In the MAS system 100, the remainder time rate is calculated for each agent simulator 200. The simulation conductor 320 comprehensively controls the speed ratio of the flow of time in the virtual world 2 to the flow of time in the real world based on the remainder time rate for each agent simulator 200.

1-3. Details of Simulation Speed Control in MAS System

Next, details of the simulation speed control performed in the MAS system 100 will be described with reference to FIGS. 4 to 10. First, it will be described from four examples assumed as the simulation status of the agent simulator 200.

1-3-1. Examples of Simulation States of Agent Simulator

Case 1. Desired State

Figure 4:
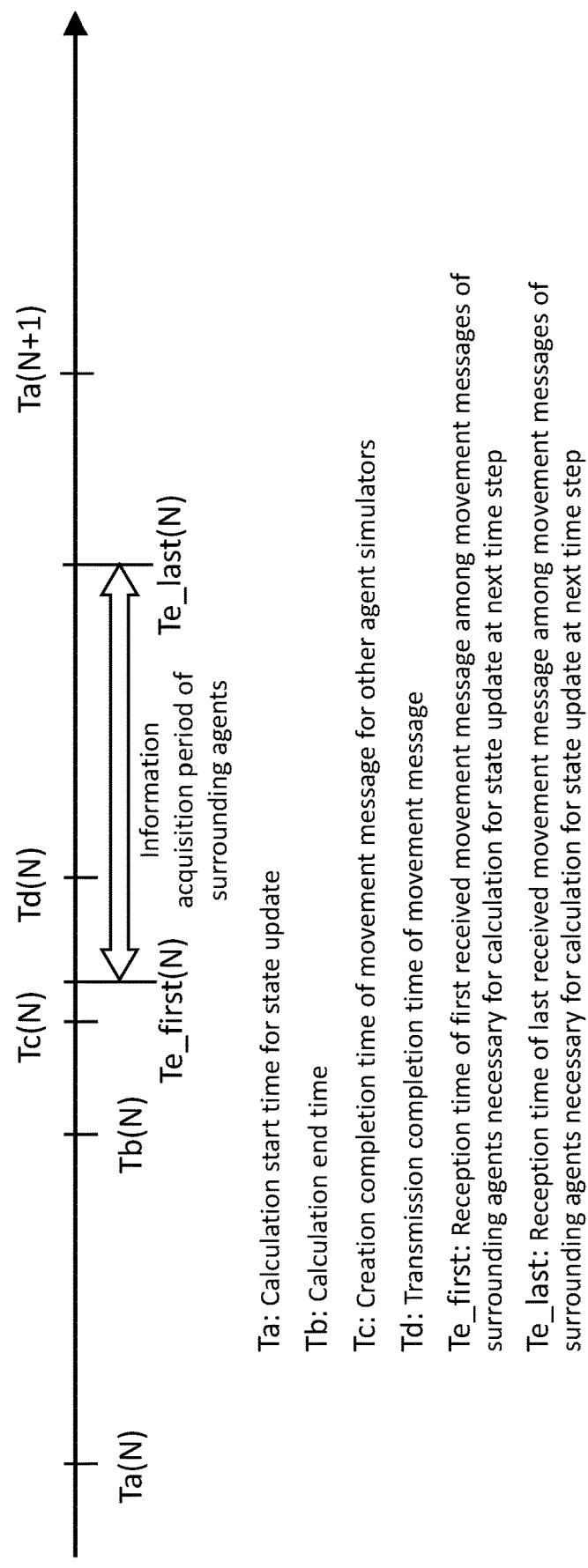
FIG. 4 is a timing diagram illustrating a desired simulation state assumed in an agent simulator according to the embodiment of the present disclosure.

Case 1 is a desired simulation state for the agent simulator 200. Hereinafter, attention is focused on one agent simulator among the plurality of agent simulators 200, which is referred to as a target agent simulator. In this case, an agent simulated by the target agent simulator is defined as an ego-agent. FIG. 4 is a timing diagram illustrating various timings related to the state update of the ego-agent in a desired state for the target agent simulator. Each timing indicated by a sign on the time axis is defined as follows.

Ta(N): Calculation start time for state update of ego-agent at the current time step Ta(N+1): Calculation start time for state update of ego-agent at next time step Tc(N): Creation completion time of movement message at the current time step Td(N): Transmission completion time of movement message at the current time step Te_first(N): Reception time of first received movement message among movement messages of surrounding agents necessary for calculation for state update of ego-agent at next time step Te_last(N): Reception time of last received movement message among movement messages of surrounding agents necessary for calculation for state update of ego-agent at next time step In case 1, the timing Te_last(N) is positioned before the timing Ta(N+1). That is, before the calculation for state update of the ego-agent at the next time step is started, all the movement messages of surrounding agents necessary for the calculation have been received. This means that there is no delay in other agent simulators related to the target agent simulator.

Further, in case 1, the timing Te_first (N+1) is not positioned before the timing Ta (N+1). That is, before the calculation for the state update of the ego-agent at the next time step is started, the movement messages of surrounding agents necessary for the calculation have not started to be received. This means that the target agent simulator is not delayed with respect to other agent simulators.

Here, the remainder time rate will be described in detail. The remainder time rate is calculated using the remainder time and the update time interval by the following equations.

Remainder Time Rate=Remaining Time/Update Time Interval

Residual time=Ta(N+1)−Te_last(N)

Update time interval=Ta(N+1)−Ta(N)

The remainder time rate is calculated for each agent simulator 200. The remainder time rate is an index value indicating a margin of the latest agent simulator among other agent simulators related to the target agent simulator with respect to the update speed of the target agent simulator. When the value of the remainder time rate is positive, the greater the remainder time rate, the greater the margin of other agent simulators with respect to the update speed of the target agent simulator. If the value of the remainder time rate is negative, at least one other agent simulator is delayed with respect to the target agent simulator.

If the remainder time rate is positive in all the agent simulators 200, there is no delay in any agent simulator 200. If the remainder time rate is large enough, there is room to further increase the simulation speed. However, if the remainder time rate is small, there is a possibility that a delay will occur in any of the agent simulators 200 by further increasing the simulation speed. In addition, when the remainder time rate is too close to zero, the remainder time rate may drift to a negative value due to deterioration of the computing/networking environment. Therefore, in order to execute the simulation as fast as possible while maintaining the accuracy of the simulation, it is desirable that the remainder time rates calculated by each agent simulator 200 are all maintained in a certain range.

Case 2. State where Some of Other Agent Simulators are Delayed

Figure 5:
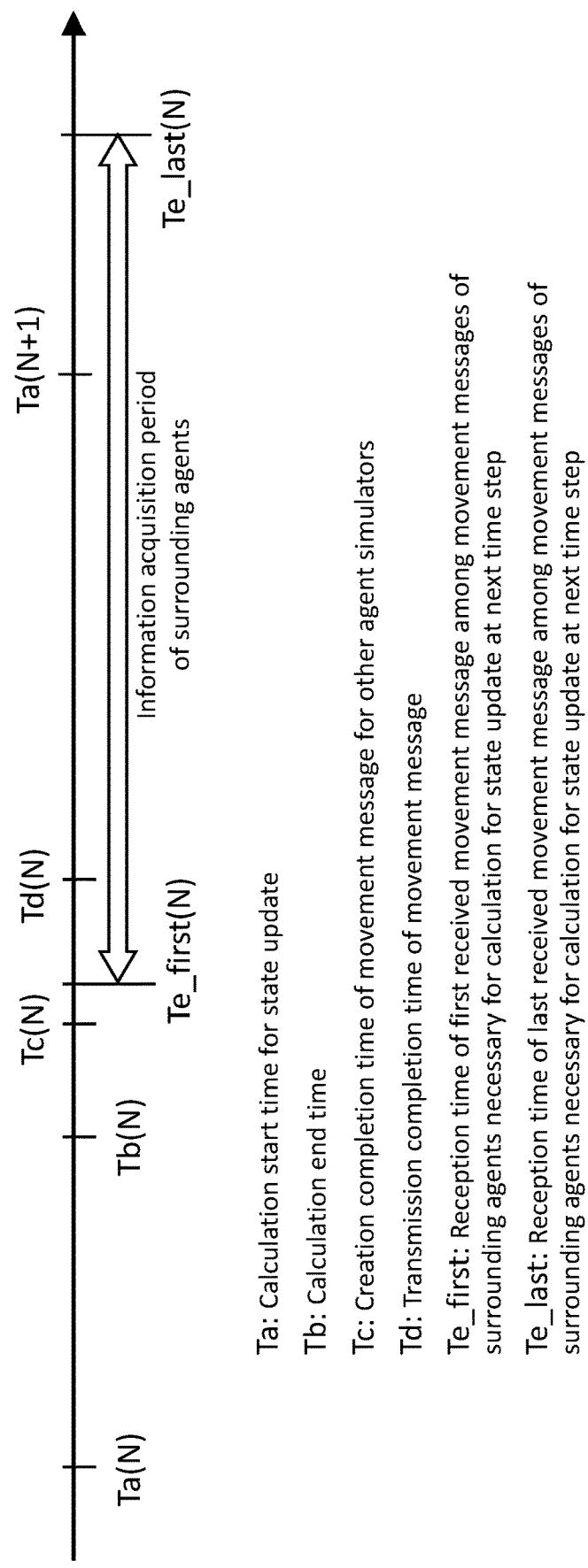
FIG. 5 is a timing diagram illustrating a simulation state assumed in an agent simulator according to the embodiment of the present disclosure in which some of other agent simulators are delayed compared with the agent simulator.

Case 2 is a state where some agent simulators among other agent simulators related to the target agent simulator are delayed. FIG. 5 is a timing diagram illustrating various timings related to the state update of the ego-agent in this state.

In case 2, the timing Test_first(N) is positioned before the timing Ta(N+1). That is, before the calculation for the state update of the ego-agent at the next time step is started, at least one of the movement messages of surrounding agents necessary for the calculation has been received.

However, in case 2, the timing Te_last(N) is not positioned before the timing Ta(N+1). That is, before the calculation for the state update of the ego-agent at the next time step is started, not all the movement messages of surrounding agents necessary for the calculation have been received. At least one movement message has been received after the calculation for the state update of the ego-agent at the next time step has started. This means that some of other agent simulators related to the target agent simulator are delayed.

In case 2, the value of the remainder time rate is negative because the timing Te_last(N) is behind the timing Ta(N+1). The existence of the agent simulator delayed with respect to the entire can be confirmed by the negative value of the remainder time rate in any agent simulator including the target agent simulator.

Figure 6:
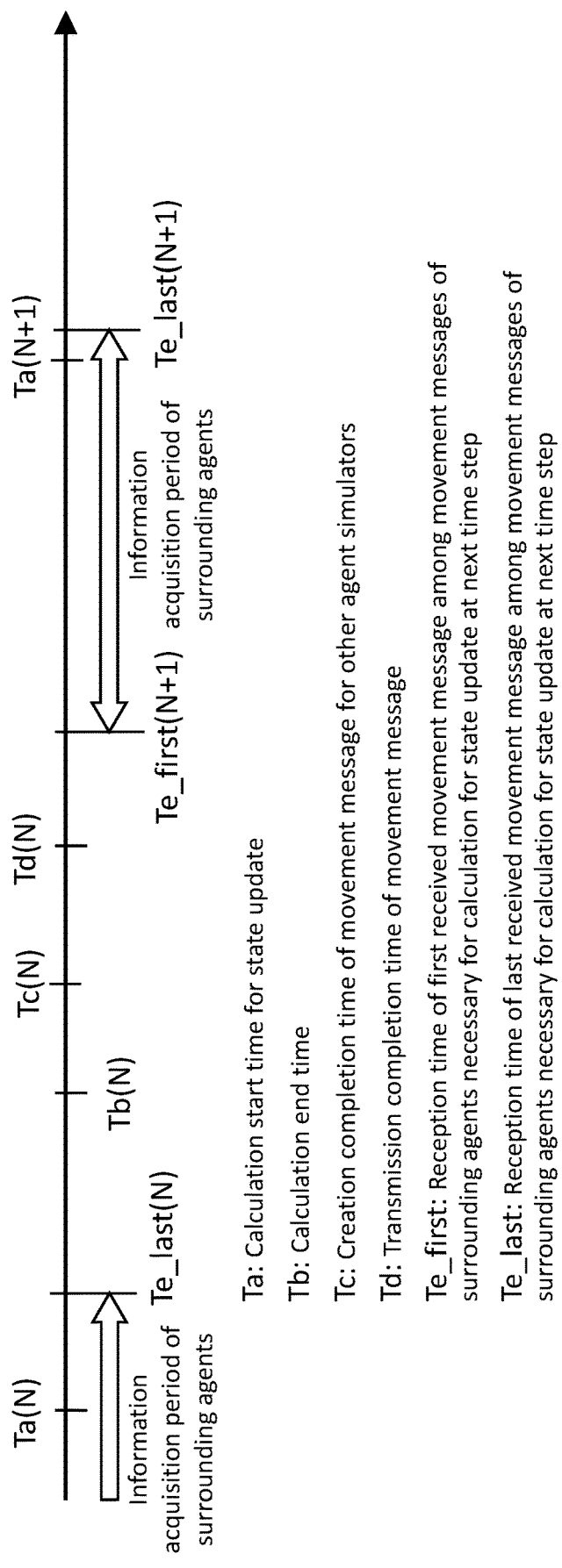
FIG. 6 is a timing diagram illustrating a simulation state assumed in an agent simulator according to the embodiment of the present disclosure in which the agent simulator is slightly delayed compared with other agent simulators.

Case 3. State Where the Target Agent Simulator is Slightly Delayed Compared with Other Agent Simulators Case 3 is a state where the target agent simulator is slightly delayed compared with other agent simulators related to the target agent simulator, FIG. 6 is a timing diagram illustrating various timings related to the state update of the ego-agent in this state.

In case 3, the timing Te_first (N+1) is positioned before the timing Ta (N+1). That is, before the calculation for the state update of the ego-agent at the time step after next is started, the movement messages of surrounding agents necessary for calculating the state update of the ego-agent at the time step after next have been received. As a result, it is observed that other agent simulators are operating faster than the target agent simulator.

However, in case 3, the timing Td (N) is positioned before the timing Te_first (N+1). That is, before the movement messages of surrounding agents necessary for the calculation for the state update of the ego-agent at the time step after next is received, the movement message of the state of the ego-agent updated at the current time step has been transmitted. This means that the target agent simulator is delayed compared with other agent simulators, but not significantly delayed. This degree of delay may be acceptable.

Figure 7:
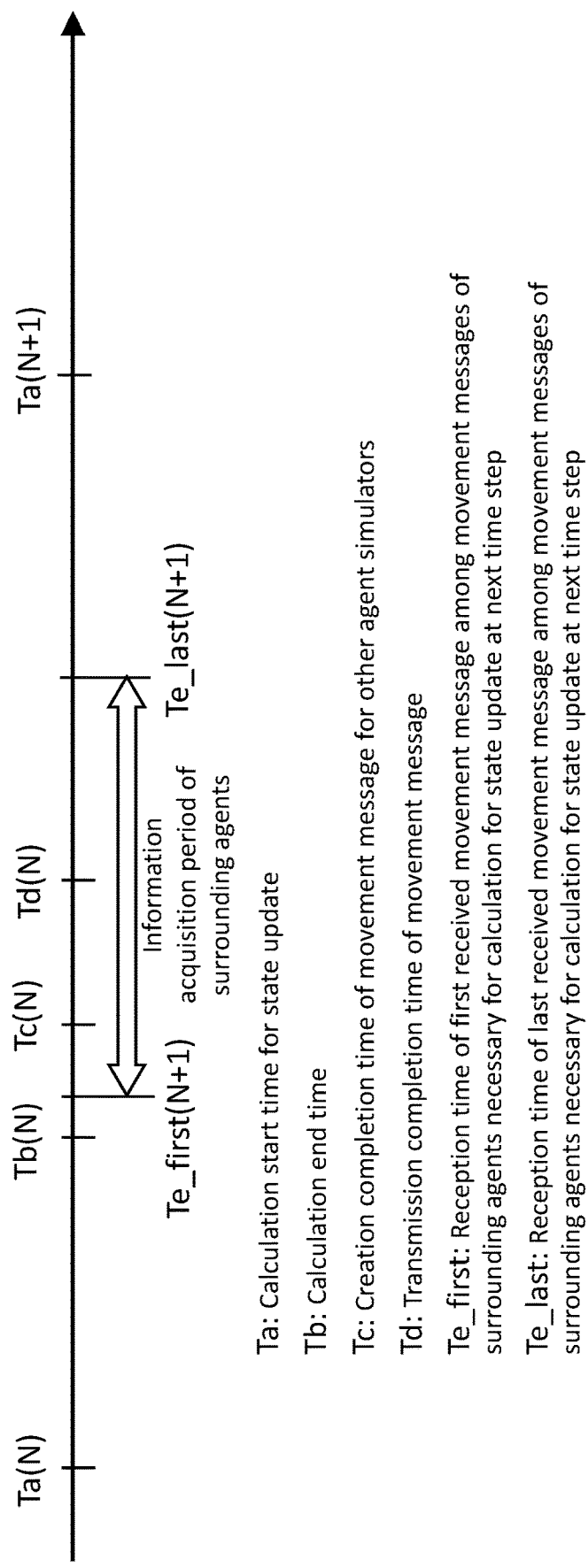
FIG. 7 is a timing diagram illustrating a simulation state assumed in an agent simulator according to the embodiment of the present disclosure in which the agent simulator is significantly delayed compared with other agent simulators.
Figure 8:
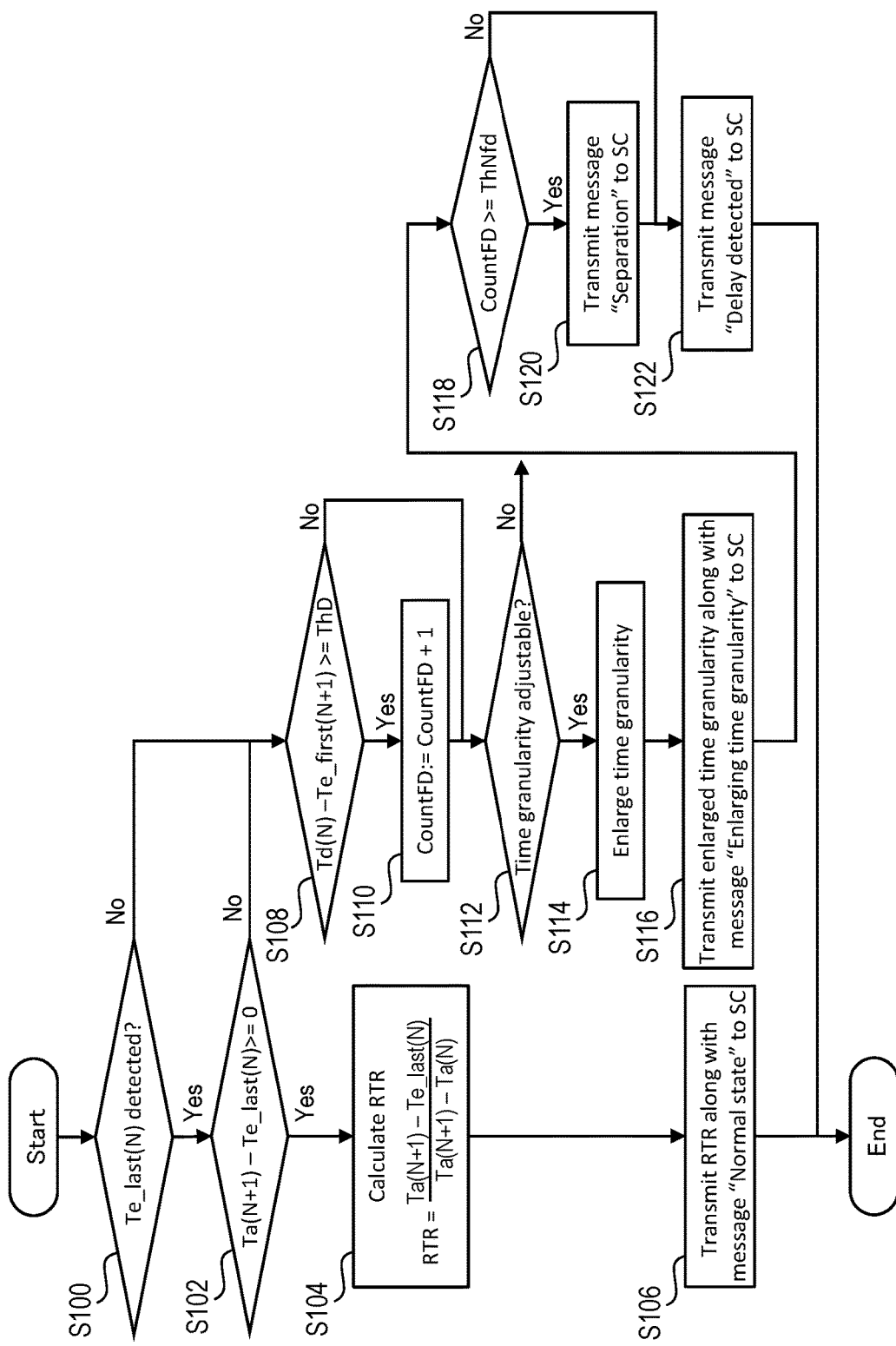
FIG. 8 is a flowchart illustrating a flow of each determination of adjustment of simulation speed and separation from a simulation by an agent simulator according to the embodiment of the present disclosure.

Case 4. State Where the Target Agent Simulator is Significantly Delayed Compared with Other Agent Simulators Case 4 is a state where the target agent simulator is significantly delayed compared with other agent simulators related to the target agent simulator. FIG. 7 is a timing diagram illustrating various timings related to the state update of the ego-agent in this state.

In case 4, the timing Te_first (N+1) is positioned before the timing Td (N). That is, before the transmission of the movement message regarding the state of the ego-agent updated at the current step is completed, the movement messages of surrounding agent necessary for the calculation for the state update of the ego-agent at the time step after next have been received. Other agent simulators are originally updating the state of surrounding agents at the next time step using the state of the ego-agent that the target agent simulator transmits at timing Td(N). Therefore, in case 4, the target agent simulator is surely delayed by one cycle with respect to the other agent simulators.

Here, a delay time is defined by the following equation. The delay time can be used as an index value to indicate the degree of delay of the target agent simulator with respect to other agent simulators.

$$\text{Delay time} = Td(N) - Te\_first(N+1)$$

In case 3, since the timing Td (N) is before the timing Te_first (N+1), the delay time is a negative value. On the other hand, in case 4, since the timing Td (N) is behind the timing Te_first (N+1), the delay time is a positive value. If the delay time is a positive value and exceeds a predetermined threshold, it can be determined that the target agent simulator is delayed to an unacceptable degree with respect to other agent simulators.

1-3-2. Processing in Agent Simulator for Simulation Speed Control

The MAS system 100 controls the simulation speed aiming at the desired state shown in case 1 of the four cases described above. The simulation speed control by the MAS system 100 is performed by cooperation of the agent simulator 200 and the simulation conductor 320.

First, it will be described from the processing in the agent simulator 200 for the simulation speed control. FIG., 8 is a flowchart illustrating a routine executed by the agent simulator 200 for the simulation speed control. In particular, a flow of each determination of adjustment of the simulation speed and separation from the simulation by the agent simulator 200 is illustrated by the flowchart. The agent simulator 200 repeatedly executes the routine shown in the flowchart at regular intervals.

In the step S100, it is determined whether or not the timing Te_last (N) has been detected after current time step. As can be seen from the comparison between FIGS. 4 to 6 and FIG. 7, whether or not the timing Te_last (N) can be detected after the current time step is a criterion for determining whether or not the agent simulator 200 is delayed to an unacceptable degree with respect to other agent simulators.

If the timing Test_last (N) can be detected after the current time step, that is, if the agent simulator 200 is not delayed to an unacceptable degree with respect to other agent simulators, the flow proceeds to step S102. In the step S102, it is determined whether or not the value of the remainder time described above is positive. The value of the remainder time being positive means that the agent simulator 200 is not delayed and other agent simulators are not delayed too.

If the value of the remainder time is positive, the step S104 is processed. In the step S104, the remainder time rate described above is calculated. In the flowchart, the remainder time rate may be referred to as RTR. Subsequently, at step S106, the remainder time rate calculated at step S104 is transmitted to the simulation conductor 320 along with the simulation control message "Normal state". Messages in the flowchart refer to simulation control messages. The simulation control message "Normal state" is a simulation control message for reporting to the simulation conductor 320 that neither the agent simulator 200 nor other agent simulators is in a delayed state. In the flowchart, the simulation conductors are referred to as SC.

If the determination result of the step S100 is negative, that is, if the timing Te_last (N) can be detected after the current time step, the flow proceeds to step S108. Further, when the determination result of the step S102 is negative, that is, when the value of the remainder time is not positive, the flow proceeds to step S108. In the step S108, it is determined whether or not the above-described delay time is equal to or greater than a delay time threshold ThD. The delay time threshold ThD is a criterion for determining whether or not the delay of the agent simulator 200 is fatal. For example, the time step of the agent simulator 200, that is, a half of the time granularity may be set as a delay time threshold ThD.

If the delay time is greater than or equal to the delay time threshold ThD, the value of a fatal delay state counter CountFD is incremented by 1 in the step S110. The fatal delay state counter is a counter for measuring the duration of a fatal delay state of the agent simulator 200. The initial value of the fatal delay state counter is zero and is reset when the processing of the step S120 described later is executed. If the delay time is less than the delay time threshold ThD, the step S110 is skipped.

Next, in the step S112, it is determined whether or not the agent simulator 200 is an agent simulator that cane vary the time interval of the simulation, that is, the agent simulator that can vary the time granularity. Basically, the agent simulator 200 can vary the time granularity. However, the variation range of the time granularity is limited depending on the agent type. For example, when the agent is a robot, precise operation is required for the robot. Therefore, it becomes difficult to establish the simulation when the time granularity exceeds the order of 100 msec. If the agent is a pedestrian, the time granularity of 1 sec order is sufficient, but it is not allowed to make the time granularity too large. Therefore, in the step S112, it is determined whether the time granularity can be varied based on the agent type and the current time granularity.

If the agent simulator 200 is a variable time granularity agent simulator that can vary the time granularity, the time granularity is enlarged in the step S114. For example, a value obtained by multiplying the current time granularity by a predetermined enlarging factor is set as a new time granularity. The enlarging factor may be a fixed value (e.g., 2), or may be a variable that decreases with each number of executions. Also, the enlarging factor may be different for each type of agent. Subsequently, in the step S116, the time granularity enlarged in the step S114 is transmitted to the simulation conductor 320 along with the simulation control message "Enlarging time granularity". The simulation control message "Enlarging time granularity" is a simulation control message for reporting to the simulation conductor 320 that the time granularity has been enlarged. If the agent simulator 200 is not a variable time granularity agent simulator, the step S114 and step S116 are skipped.

Next, in the step S118, it is determined whether or not the value of the fatal delay state counter CountFD is equal to or greater than a count threshold ThNfd. The count threshold ThNfd is a threshold value for determining that the fatal delay state of the agent simulator 200 is stationary. The count threshold ThNfd may be set to a different value depending on whether or not the agent simulator 200 is a variable time granularity agent simulator. For example, the count threshold ThNfd set for a variable time granularity agent simulator may be greater than the count threshold ThNfd set for a non-variable time granularity agent simulator that cannot vary the time granularity. As a specific example, the number threshold ThNfd set for a variable time granularity agent simulator may be set to 5 times and the number threshold ThNfd set for a non-variable time granularity agent simulator may be set to 3 times.

If the fatal delay state counter is equal to or greater than the count threshold ThNfd, then at step S120, a simulation control message "Separation" is transmitted to the simulation conductor 320. The simulation control message "Separation" is a simulation control message for reporting to the simulation conductor 320 that the agent simulator 200 is detached from the simulation. The agent simulator which transmits the simulation control message "Separation" separates from the simulation by itself. If the fatal delay state counter is less than the count threshold ThNfd, the step S120 is skipped.

In a stepped S122, a simulation control message "Delay detected" is transmitted to the simulation conductor 320. The simulation control message "Delay detected" is a simulation control message for reporting to the simulation conductor 320 that either the agent simulator 200 or other agent simulators is in a delayed state. Even if the time granularity is varied in the step S114, the transmission of the simulation control message "Delay detected" is always performed once. That is, until the agent simulator 200 separates from the simulation, either the simulation control message "Normal state" or the simulation control message "Delay detected" is always transmitted to the simulation conductor 320.

1-3-3. Processing in Simulation Conductor for Simulation Speed Control

Figure 9:
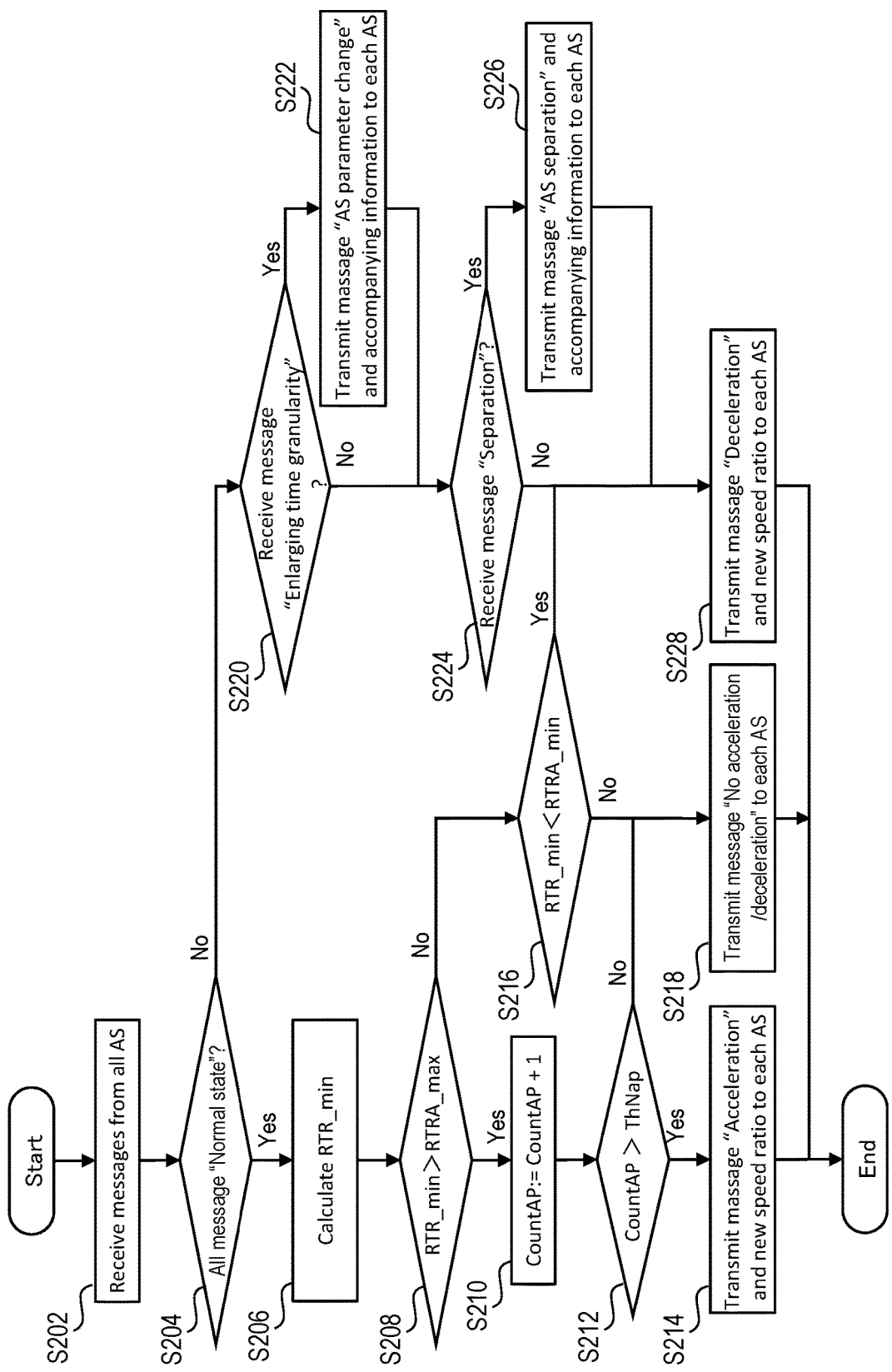
FIG. 9 is a flowchart illustrating a flow of adjustment of simulation speed of an agent simulator by a simulation conductor according to the embodiment of the present disclosure.

Next, the processing in the simulation conductor 320 for the simulation speed control will be described. FIG. 9 is a flowchart illustrating a routine performed by the simulation conductor 320 for the simulation speed control. In particular, the flow of adjustment of the simulation speed of the agent simulator 200 by the simulation conductor 320 is illustrated by a flow chart. The simulation conductor 320 repeatedly executes the routine shown in the flowchart at regular intervals.

First, in step S202, the simulation conductor 320 receives simulation control messages from all the agent simulators 200. In the flowchart, the agent simulator is referred to as AS. Also, messages in the flowchart refer to simulation control messages.

In the step S204, it is determined whether or not the content of all simulation control messages acquired in the step S202 is "Normal state". If all simulation control messages obtained from all the agent simulators 200 are "Normal state", there is no agent simulator 200 with a delay. In that case, the remainder time rate is acquired along with the simulation control messages from all the agent simulators 200.

If the determination result of the step S204 is positive, a minimum value RTR_min of the remainder time rate is calculated at the step S206. The minimum value of the remainder time rate is the smallest value among all the remainder time rates obtained from all the agent simulators 200.

Next, in the step S208, it is determined whether or not the minimum value RTR_min of the remainder time rate is greater than an allowable maximum value RTRA_max (first threshold) of the remainder time rate. An allowable range corresponding to a desired simulation speed is set for the remainder time rate. If the remainder time rate is greater than the maximum value in the allowable range, it means that idle time occurs in the calculation of the agent simulator 200. This means that there is room to accelerate the simulation speed.

If the minimum value RTR_min of the remainder time rate is greater than the allowable maximum value RTRA_max, the value of the accelerable state counter CountAP is incremented by 1 in the step S210. The initial value of the accelerable state counter is zero. When the processing of step S214 to be described later is executed, and when the determination result of the step S208 becomes negative, it is reset.

Next, in the step S212, it is determined whether or not the value of the accelerable state counter CountAP is greater than an acceleration determination threshold ThNap. The acceleration determination threshold ThNap is a threshold for determining that the accelerable state continues for a certain period of time. The acceleration determination threshold ThNap may be set to a fixed value (e.g., 3).

If the accelerable state counter is greater than the accelerable determination threshold ThNap, a simulation control message "Acceleration" and a new speed ratio are transmitted to all the agent simulators 200 at the step S214. The new speed ratio transmitted here means the speed ratio after the acceleration of the flow of time in the virtual world 2 to the flow of time in the real world. The simulation control message "Acceleration" is an indication of acceleration for each agent simulator 200, and the new speed ratio transmitted at the same time is its indication value. The higher the minimum value of the remainder time rate calculated by the step S206, the higher the new speed ratio may be. According to this, it is possible to accelerate the simulation speed more greatly as there is a margin in the remainder time rate.

On the other hand, when the accelerable state counter is equal to or less than the acceleration determination threshold ThNap, a simulation control message "No acceleration/deceleration" is transmitted to all the agent simulators 200 in the step S218. The simulation control message "No acceleration/deceleration" is an instruction to maintain the current speed ratio for each agent simulator 200.

As a result of the determination of the step S208, when the minimum value RTR_min of the remainder time rate is equal to or less than the allowable maximum value RTRA_max, it is determined in the step S216 whether or not the minimum value RTR_min of the remainder time rate is less than the allowable minimum value RTRA_min (second threshold) of the remainder time rate. If the remainder time rate is less than the minimum value of the allowable range of the remainder time rate, it means that there is no room in the calculation time of the agent simulator 200. This means that the simulation speed should be decelerated down so that no delay occurs.

If the minimum value RTR_min of the remainder time rate is less than the allowable maximum value RTRA_max, then in the step S228, the simulation control message "Deceleration" and a new speed ratio are transmitted to all the agent simulators 200. The new speed ratio transmitted here means the speed ratio after the deceleration of the flow of time in the virtual world 2 to the flow of time in the real world. The simulation control message "Deceleration" is an indication of deceleration for each agent simulator 200, and the new speed ratio transmitted at the same time is its indication value. As the minimum value of the remainder time rate calculated in the step S206 is closer to zero, the new speed ratio may be further reduced. This makes it possible to decelerate the simulation speed more greatly as the margin in the remainder time rate is smaller.

On the other hand, when the minimum value RTR_min of the remainder time rate is equal to or greater than the allowable maximum value RTRA_max, in the step S218, the simulation control message "No acceleration/deceleration" is transmitted to each agent simulator 200.

Further, when the determination result of the step S204 is negative, that is, when the content of at least one simulation control message is not "Normal state", the determination of the step S220 is performed. In the step S220, it is determined whether or not the simulation control message "Enlarging time granularity" has been received from any of the agent simulators 200.

If the determination result of the step S220 is positive, a simulation control message "Agent simulator parameter change" and accompanying information are transmitted to all the agent simulators 200 in the step S222. The accompanying information transmitted here includes the number of agent simulators with enlarged time granularity, the ID of each agent simulator with enlarged time granularity, and a new time granularity. That is, in the step S222, a simulation control message is transmitted for the purpose of informing each agent simulator 200 about the adjustment of the time granularity. If the determination result of the step S220 is negative, the step S222 is skipped.

Next, in the step S224, it is determined whether or not the simulation control message "Separation" has been received from any of the agent simulators 200. That is, the separation based on the determination of the agent simulator 200 itself is detected by the simulation control message "Separation".

If the determination result of the step S224 is positive, a simulation control message "Agent simulator separation" and accompanying information are transmitted to each agent simulator 200 at the step S226. The accompanying information transmitted here includes the number of agent simulators that have escaped from the simulation and the ID of each agent simulator that has escaped. That is, in the step S226, the simulation control message is transmitted for the purpose of informing each agent simulator 200 about the separation of an agent simulator 200. If the determination result of the step S224 is negative, the step S226 is skipped. Then, the process of the step S228 is executed.

Figure 10:
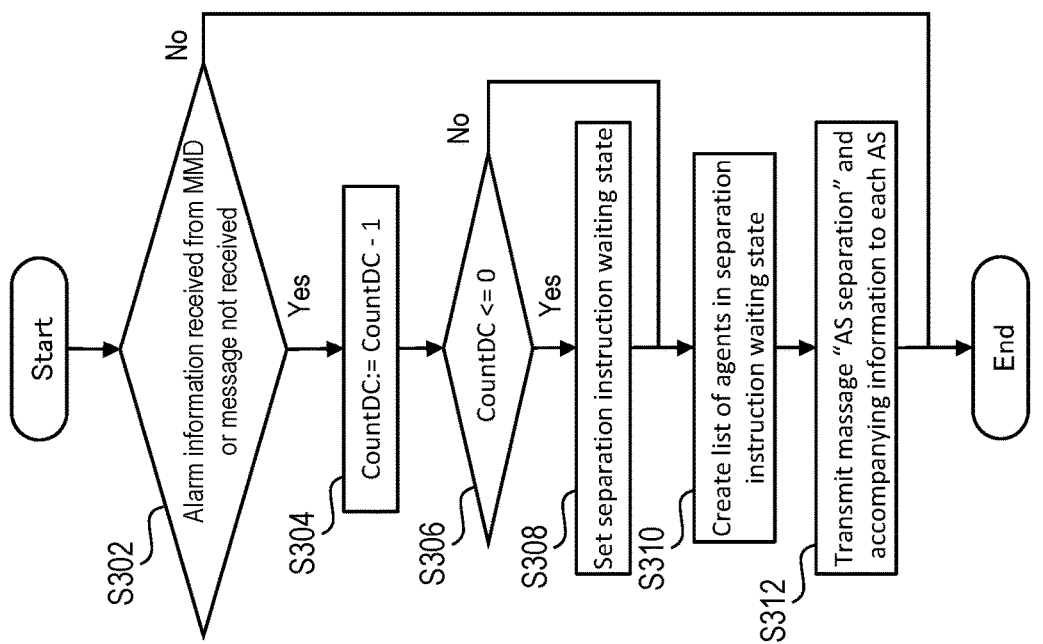
FIG. 10 is a flowchart illustrating a flow of instructing an agent simulator to separate from a simulation according to a determination of a simulation conductor according to the embodiment of the present disclosure.

In the routine described above, the determination of separation from the simulation by the agent simulator 200 itself is performed. The separation of the agent simulator 200 from the simulation is determined by the agent simulator 200 itself. In parallel with this, the simulation conductor 320 also makes a decision to cause the agent simulator 200 to separate from the simulation. FIG. 10 is a flowchart illustrating a routine executed by the simulation conductor 320 for instructing separation to the agent simulator 200. In particular, the flow of instructions to separate the agent simulator 200 from the simulation by the determination of the simulation conductor 320 is illustrated by the flowchart. The simulation conductor 320 repeatedly executes the routine shown in the flowchart at regular intervals.

First, in step S302, it is determined whether or not alarm information has been received from the movement message dispatcher 310. In the flowchart, the movement message dispatcher is referred to as MMD. movement messages are transmitted from each agent simulator 200 to the movement message dispatcher 310 at time intervals corresponding to the agent's time granularity. If a delay more than a predetermined time is detected in receiving a movement message, the mobile message dispatcher 310 transmits alarm information to the simulation conductor 320 about the agent simulator 200 that has transmitted the delayed movement message.

Further, in the step S302, for all the agent simulators 200, it is determined whether or not a simulation control message has been received from any of the agent simulators 200. Messages in the flowchart refer to simulation control messages. If alarm information from the movement message dispatcher 310 has not been received and a simulation control message has been received from any of the agent simulators 200, further processing is skipped.

The flow proceeds to step S304 when alarm information is received from the movement message dispatcher 310 or when no simulation control message is received from any of the agent simulators. In the step S304, for the agent simulator 200 corresponding to the positive determination of the step S302, the value of a separation determination counter CountDC, which is provided for each agent simulator 200, is decremented by 1. The initial value of the separation determination counter is set to the maximum allowable number of times (e.g., 3).

In the step S306, it is determined whether or not the value is equal to or less than zero for each separation determination counter. The process of the following step S308 is skipped until the value of the separation determination counter is equal to or less than zero. When the value of the separation determination counter becomes zero or less, in step S308, a separation instruction waiting state is set to the agent simulator 200 in which the value of the separation determination counter becomes zero or less.

In the following step S310, a list of agents 200 that have entered the separation instruction waiting state is created. Then, in the step S312, a simulation control message "Agent simulator separation" and accompanying information are transmitted to all the agent simulators 200. The accompanying information transmitted here includes the number of agent simulators to be separated from the simulation and the ID of each agent simulator to be separated. The agent simulator included in the list is separated from the simulation by receiving the simulation control message "Agent simulator separation".

1-3-4. Process for Restarting Simulation after Stop

As described above, in the MAS system 100, the agent simulator 200 in the delayed state separates from the simulation by its own determination of the agent simulator 200 or by the determination of the simulation conductor 320. This prevents the agent simulator 200 in the delayed state from becoming rate-limiting when increasing the simulation speed. However, as the number of agent simulators 200 that separate from the simulation increases, it becomes increasingly difficult for the simulation to be established.

Therefore, the simulation conductor 320 determines whether or not the number of the agent simulator 200 that has separated from the simulation has exceeded a predetermined number threshold value. When the state in which the number of separated agent simulators exceeds the predetermined number threshold continues for a number of times equal to or greater than the count threshold, the simulation conductor 320 transmits a simulation control message "Stop" to all the agent simulators 200. The simulation control message "Stop" is an instruction to stop the simulation to each agent simulator 200.

Figure 11:
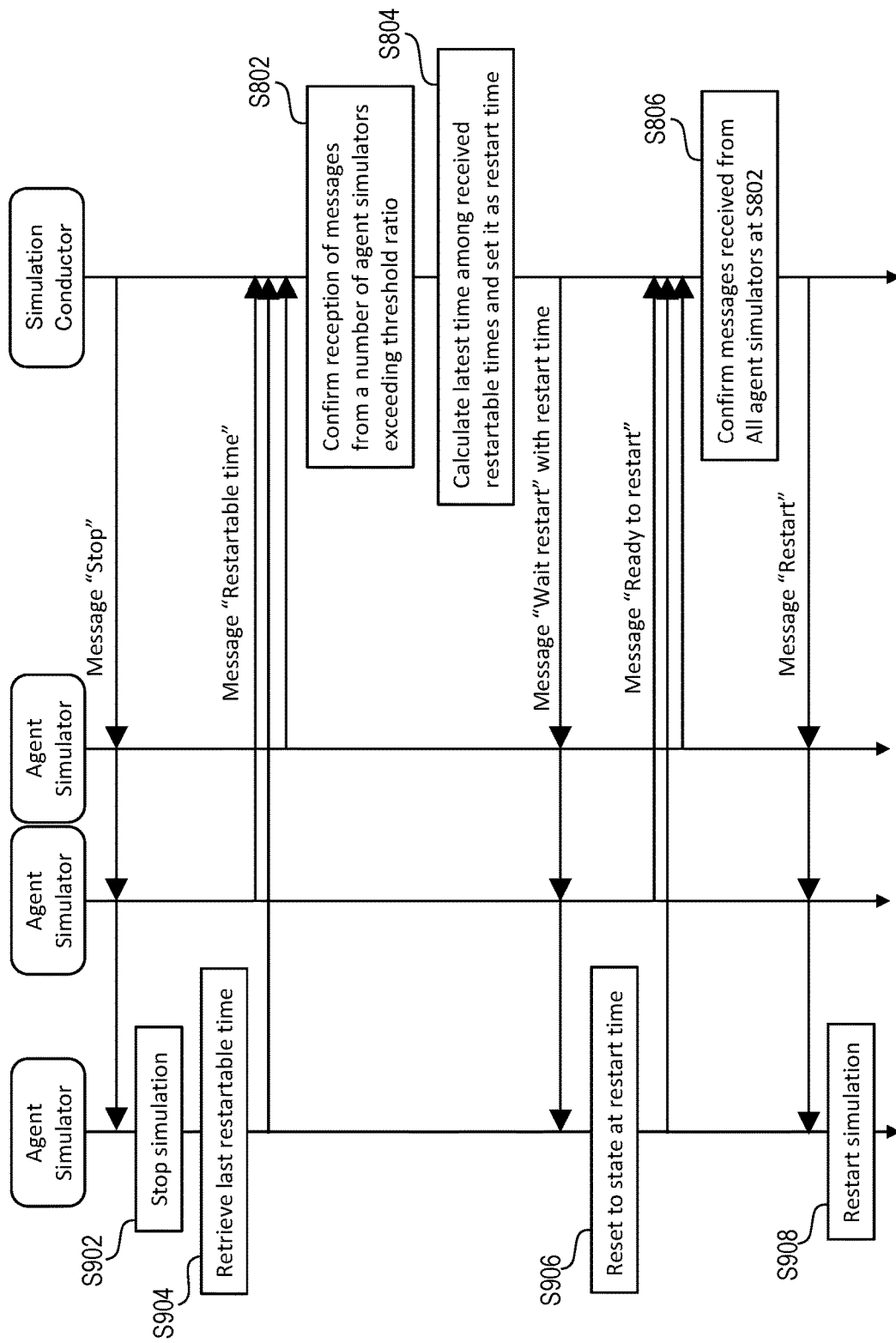
FIG. 11 is a sequence diagram illustrating a flow of rewind and restart of a simulation according to a determination of a simulation conductor according to the embodiment of the present disclosure.

After the stop of the simulation, the simulation conductor 320 rewinds the time of the simulation in the past to restart the simulation. FIG. 11 is a sequence diagram illustrating a flow of rewind and restart of the simulation according to the determination of the simulation conductor 320. Although three agent simulators 200 appear in the sequence diagram, only the processing executed by one agent simulator 200 is shown as a representative.

Each agent simulator 200 stops the simulation (S902 of steps) when the simulation control message "Stop" is transmitted from the simulation conductor 320. Each agent simulator 200 then retrieves from the data log of the simulation the last time at which the above-mentioned remainder time maintained a positive value (step S904). The last time retrieved is the last time at which the simulation can be restarted. Each agent simulator 200 transmits a simulation control message "Restartable time" to the simulation conductor 320, including the last time retrieved as the restartable time.

The simulation conductor 320 confirms the reception of simulation control messages "Restartable time" from the number of agent simulators 200 exceeding a threshold ratio (step S802). The simulation conductor 320 calculates the latest time among the received restartable times and sets it to a restart time of the simulation (step S804). The simulation conductor 320 transmits the restart time along with a simulation control message "Wait restart" to the agent simulator 200 that has received the simulation control message at the step S802.

Each agent simulator 200 reads the state at the instructed restart time from the data log and resets the state of the agent simulator 200 (step S906). As soon as the simulation is ready to restart, the agent simulator 200 transmits a simulation control message "Ready to restart" to the simulation conductor 320.

The simulation conductor 320 confirms the reception of simulation control messages "Ready to restart" from all the agent simulators 200 received the simulation control message at the step S802 (step S806). The simulation conductor 320 transmits a simulation control message "Restart" to the agent simulator 200 that has received the simulation control message at the step S802.

Upon receiving the simulation control message "Restart", the agent simulator 200 restarts the simulation from the state that is reset at the step S906 (step S908).

2. Overall Configuration and Information Flow of MAS System

Figure 12:
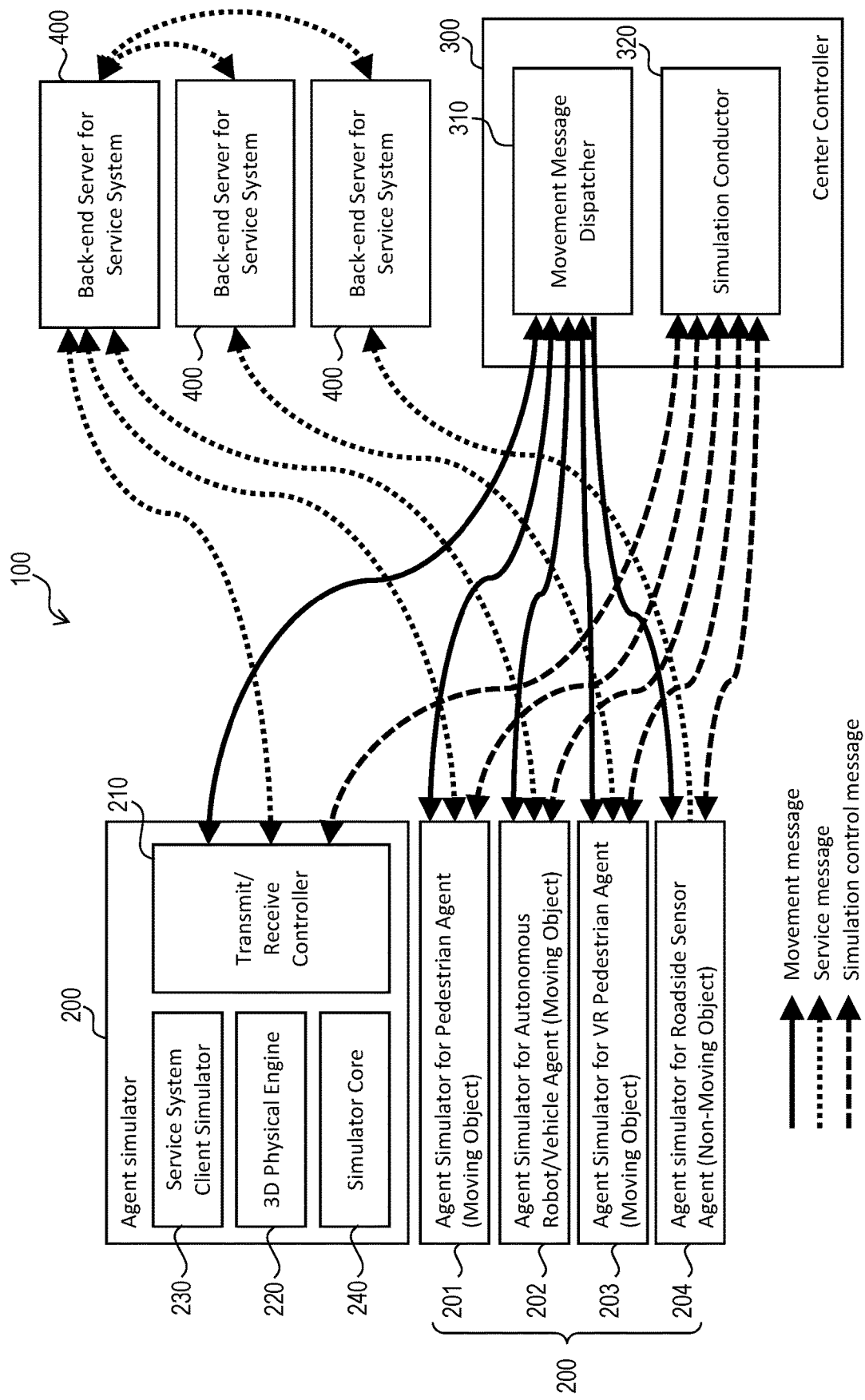
FIG. 12 is a block diagram illustrating a configuration of the multi-agent simulation system according to the embodiment of the present disclosure.

The overall configuration of the MAS system 100 capable of executing the above-described simulation speed control and flows of information will be described below with reference to FIG. 12. As shown in FIG. 12, the MAS system 100 includes a plurality of agent simulators 200, a center controller 300, and a back-end server 400 for a plurality of service systems. As will be described in detail later, these are distributed among a plurality of computers. That is, the MAS system 100 is a system based on parallel distributed processing by a plurality of computers.

The center controller 300 includes, as its function, a movement message dispatcher 310 and a simulation conductor 320. The center controller 300 is application software installed on the computer. The movement message dispatcher 310 and the simulation conductor 320 are programs that comprise the application software. The center controller 300 may share a computer that is hardware with one or more agent simulators 200, but preferably uses one computer exclusively.

The movement message dispatcher 310 relays the transmission and reception of movement messages between the agent simulators 200. Flows of information indicated by solid lines between the agent simulators 200 and the movement message dispatcher 310 indicate flows of movement messages. The movement message dispatcher 310 is responsible for the exchange of the above-described movement messages provided by the center controller 300. The movement message dispatcher 310 communicates with all of the agent simulators 200 comprising the MAS system 100.

The simulation conductor 320 exchanges simulation control messages with the agent simulators 200. The flow of information indicated by dashed lines between the agent simulator 200 and the simulation conductor 320 is the flow of simulation control messages. Unlike movement messages being exchanged between the plurality of agent simulators 200 via the movement message dispatcher 310, simulation control messages are exchanged separately between the simulator conductor 320 and the individual agent simulators 200.

The back-end server 400 is the same back-end server actually used in the real-world service system. By bringing the back-end server 400 in the real-world into the virtual world, the service provided by the service system can be simulated with high accuracy. The services simulated in the MAS system 100 can include, for example, mobility services such as on-demand buses and ferry type buses using autonomous traveling vehicles, and logistics services for delivering packages using autonomous mobile robots. The service simulated by the MAS system 100 is, for example, a service that can be used by a user operating a service application in a user terminal.

The MAS system 100 includes a plurality of back-end servers 400 for different service systems and can simulate multiple types of services simultaneously in the virtual world 2. The simulation of a service is performed by the exchange of service messages between the back-end server 400 and the agent simulator 200. Flows of information indicated by dotted lines between the agent simulators 200 and the back-end servers 400 indicate flows of service messages. Each back-end server 400 exchanges service messages with the agent simulator 200 related to the provision of the service.

The contents of the service messages exchanged depend on the type of agent that the agent simulator 200 is in charge of. For example, if the agent is a user (a pedestrian) using services, the back-end server 400 receives service messages including service use information from the agent simulator 200 and transmits service messages including service provision state information to the agent simulator 200. The service use information is information on the current state and the future plan on the utilization of the service system by the user, and includes a current use state and input information by an application operation. The service provision state information is information on the state of the user in the service system and is information provided through a service application of the user terminal.

If the agent is an autonomous robot or autonomous vehicle used to provide services, the back-end server 400 receives service messages including operation state information from the agent simulator 200 and transmits service messages including operation instruction information to the agent simulator 200. The operation state information is information on the current state and the future plan of an autonomous robot or autonomous vehicle. The information on the current state is, for example, status of mounted sensors, measured data, status of mounted actuators, and status on action determination. The information on the future plan is, for example, a list of future times, status of actuators, and status of action decisions. The operation instruction information is information that includes all or some of the future plan for providing services using an autonomous robot or autonomous vehicle. For example, the target points and paths that an autonomous robot or autonomous vehicle should move are included in the operation instruction information.

The agents present in the virtual world 2 include nonmoving objects such as roadside sensors including cameras and automatic doors. For example, if the agent is a fixed camera, the back-end server 400 receives service messages from the agent simulator 200 containing image information of the fixed camera necessary to calculate location information of the autonomous robot. Also, if the agent is an automatic door, the back-end server 400 transmits service messages to the agent simulator 200 that includes an instruction to open the door for the passage of the autonomous robot.

The back-end server 400 exchanges service messages with the other back-end servers 400 under their respective agreements. Flows of information indicated by dashed lines between the back-end servers 400 indicate flows of service messages. The service messages exchanged at this time includes, for example, the use state of the user in each service and the provision state of the service. By exchanging service messages between the plurality of back-end servers 400, the services provided in the virtual world 2 can be linked to each other.

One example of linkage of a plurality of services is linkage between an on-demand bus service and a logistics service in which autonomous robots carry packages on behalf of users from bus stops to homes. In the on-demand bus service, a user can get off the bus at a desired time and at a desired location. By linking the on-demand bus service and the logistics service, it is possible to have the autonomous robot arrive at the getting-off location before the user arrives and allow the autonomous robot to wait for the user to arrive at the getting-off location. In addition, when the bus is delayed due to traffic congestion or the like, or when the user is delayed on the bus, by exchanging service messages between the back-end servers 400, the time for directing the autonomous robot to the getting-off location can be adjusted to the user's arrival time.

However, some back-end servers that are actually used in the real-world service systems cannot adjust the processing speed. When a time-dependent service is provided in the virtual world 2 using such a back-end server, changing the speed ratio of the flow of time in the virtual world 2 to the flow of time in the real world prevents the service provided by the service system from being simulated. Therefore, when executing the simulation while changing the speed ratio, it is preferable that the service provided in the virtual world 2 is a service without the concept of time.

There are a plurality of types of agent simulators 200 according to the types of agents that they are in charge of. For example, there are an agent simulator 201 for a pedestrian agent, an agent simulator 202 for an autonomous robot/vehicle agent, an agent simulator 203 for a VR pedestrian agent, and an agent simulator 204 for a roadside sensor agent. Hereafter, the agent simulator 200 is a general term for the plurality of types of agent simulators 201, 202, 203, 204.

The agent simulator 200 includes, as its function, a transmit/receive controller 210, a 3D physical engine 220, a service system client simulator 230, and a simulator core 240. The agent simulator 200 is application software installed on the computer. The transmit/receive controller 210, the 3D physical engine 220, the service system client simulator 230, and the simulator core 240 are programs that comprise the application software. These functions differ among the agent simulators 201, 202, 203, 204. Here, the functions that are generally common among the agent simulators 201, 202, 203, 204 will be described, and details of the functions of the agent simulators 201, 202, 203, 204 will be described later.

The transmit/receive controller 210 is an interface between the agent simulator 200 and other programs. The transmit/receive controller 210 receives movement messages from the movement message dispatcher 310 and transmits movement messages to the movement message dispatcher 310. However, in the agent simulator 204, only the reception of movement messages is performed. The transmit/receive controller 210 receives simulation control messages from the simulation conductor 320 and transmits simulation control messages to the simulation conductor 320. The transmit/receive controller 210 receives service messages from the back-end server 400 and transmits service messages to the back-end server 400. However, in the agent simulator 204, only the transmission of service messages is performed.

The 3D physical engine 220 estimates the current states of surrounding agents in three-dimensional space based on the movement messages received from other agent simulators 200. Estimation of the current states of the surrounding agents based on the previous states is performed by the 3D physical engine 220. The 3D physical engine 220 generates peripheral information obtained by observation from the ego-agent based on the current states of the surrounding agents. The 3D physical engine 220 updates the state of the ego-agent in the three-dimensional space based on the simulation result by the simulator core 240 described later, and generates movement messages representing the state of the ego-agent. However, in the agent simulator 204, since the agent that the agent simulator 204 is in charge of is fixed, the state of the ego-agent is not updated and movement messages are not generated.

The service system client simulator 230 simulates the behavior of the ego-agent as a client of the service system associated with the back-end server 400. The service messages received by the transmit/receive controller 210 are input to the service system client simulator 230. The service messages generated by the service system client simulator 230 are transmitted from the transmit/receive controller 210. However, in the agent simulator 204, only the generation of service messages is performed.

The simulator core 240 simulates the state of the ego-agent in the next time step. The time interval of the time step for calculating the state of the ego-agent is the above-mentioned time granularity. The content of the simulation in the simulator core 240 differs for each type of agent simulator 200. Note that the agent simulator 204 does not have the simulator core 240 because the agent that the agent simulator 204 is in charge of is fixed and the simulation of the state of the ego-agent is unnecessary.

3. Detailed Configuration and Information Flow of Agent Simulator

Next, a detailed configuration and information flows of the various agent simulators 201, 202, 203, 204 comprising the MAS system 100 will be described with reference to FIGS. 13 to 16. In FIGS. 13 to 16, flows of information between blocks indicated by solid lines indicate flows of movement messages. Flows of information between blocks indicated by dotted lines indicate flows of service messages. Flows of information between blocks indicated by dashed lines indicate flows of simulation control messages.

3-1. Agent Simulator for Pedestrian Agent

Figure 13:
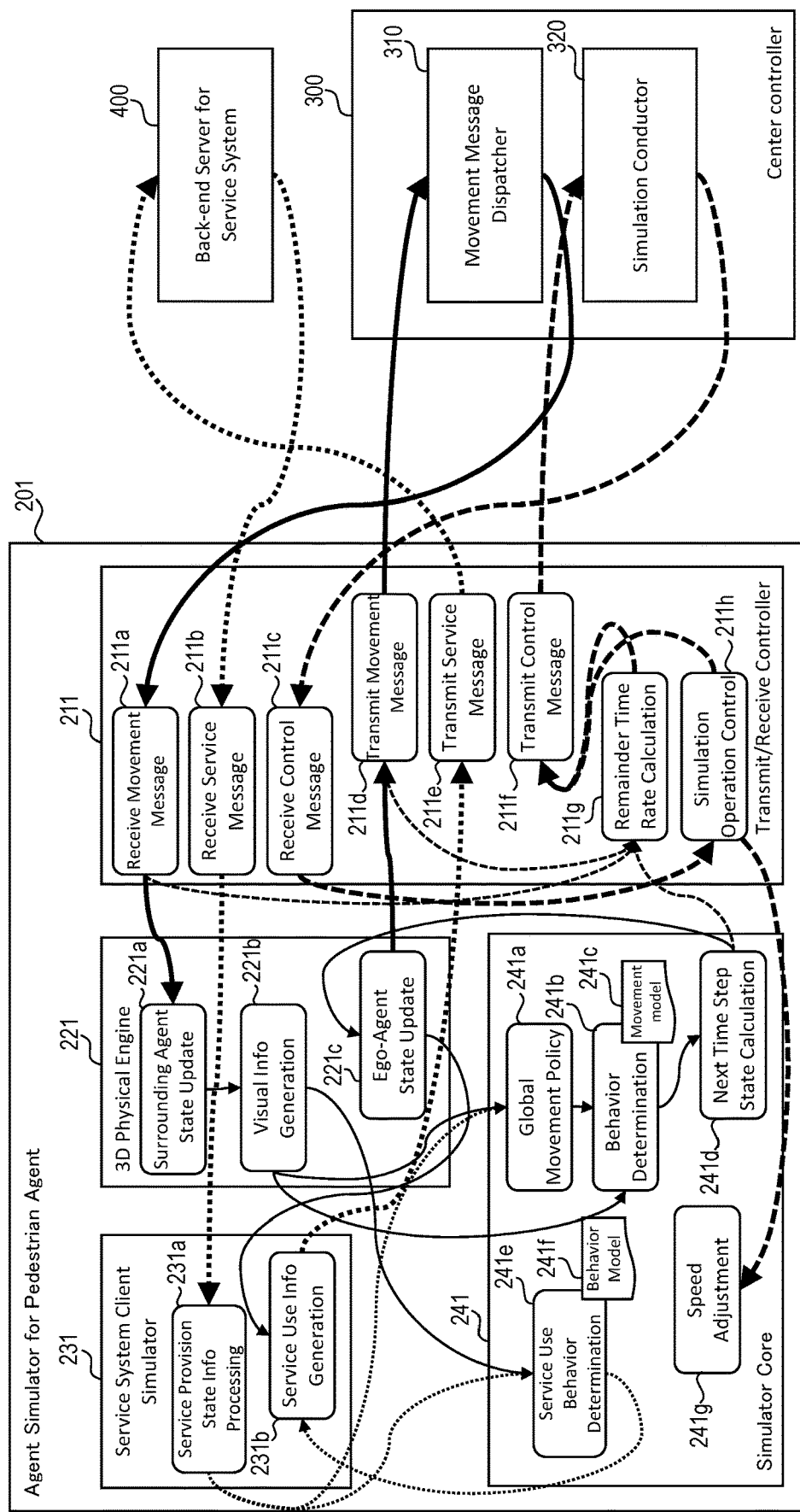
FIG. 13 is a block diagram illustrating a configuration and flows of information of an agent simulator for a pedestrian agent according to the embodiment of the present disclosure.

FIG. 13 is a block diagram illustrating a configuration and flows of information of an agent simulator 201 for a pedestrian agent. Hereinafter, the overall configuration of the agent simulator 201 for the pedestrian agent, the details of each part, and flows of information in the agent simulator 201 will be described below.

3-1-1. Overall Configuration of Agent Simulator for Pedestrian Agent

The agent simulator 201 includes, as its function, a transmit/receive controller 211, a 3D physical engine 221, a service system client simulator 231, and a simulator core 241. These functions are conceptually included in the transmit/receive controller 210, the 3D physical engine 220, the service system client simulator 230, and the simulator core 240, respectively.

The transmit/receive controller 211 includes a movement message receiving unit 211a, a service message receiving unit 211b, and a control message receiving unit 211c as functions for receiving various messages. The transmit/receive controller 211 includes a movement message transmitting unit 211d, a service message transmitting unit 211e, and a control message transmitting unit 211f as functions for transmitting various messages. The transmit/receive controller 211 further includes a remainder time rate calculating unit 211g and a simulation operation controlling unit 211h. Each of the units 211a to 211h comprising the transmit/receive controller 211 is a program or a part of a program. It should be noted that the description in each block describes a representative function of each unit and does not necessarily coincide with the name of each unit.

The 3D physical engine 221 includes, as its functions, a surrounding agent state updating unit 221a, a visual information generating unit 221b, and an ego-agent state updating unit 221c. Each of the units 221a, 221b, 221c comprising the 3D physical engine 221 is a program or a part of a program. It should be noted that the description in each block describes a representative function of each unit and does not necessarily coincide with the name of each unit.

The service system client simulator 231 includes, as its functions, a service provision state information processing unit 231a and a service use information generating unit 231b. Each of the units 231a and 231b comprising the service system client simulator 231 is a program or a part of a program. It should be noted that the description in each block describes a representative function of each unit and does not necessarily coincide with the name of each unit.

The simulator core 241 includes, as its functions, a global movement policy determining unit 241a, a behavior determining unit 241b, a next time step state calculating unit 241d, a service use behavior determining unit 241e, and a speed adjusting unit 241g. Each of the units 241a, 241b, 241d, 241e, 241g comprising the simulator core 241 is a program or a part of a program. It should be noted that the description in each block describes a representative function of each unit and does not necessarily coincide with the name of each unit.

3-1-2. Details of Transmit/Receive Controller

In the transmit/receive controller 211, the movement message receiving unit 211a receives a movement message from the movement message dispatcher 310. The movement message receiving unit 211a outputs the received movement message to the surrounding agent state updating unit 221a of the 3D physical engine 221. In addition, the movement message receiving unit 211a outputs information including the time at which the movement message is received to the remainder time rate calculating unit 211g.

The service message receiving unit 211b receives a service message from the back-end server 400. The service message receiving unit 211b outputs the received service message to the service provision state information processing unit 231a of the service system client simulator 231.

The control message receiving unit 211c receives a simulation control message from the simulation conductor 320. The control message receiving unit 211c outputs the received simulation control message to the simulation operation controlling unit 211h.

The movement message transmitting unit 211d acquires a movement message including the current state of the ego-agent from the ego-agent state updating unit 221c of the 3D physical engine 221. The movement message transmitting unit 211d transmits the acquired movement message to the movement message dispatcher 310. In addition, the movement message transmitting unit 211d transmits information including the transmission completion time of the movement message to the remainder time rate calculating unit 211g.

The service message transmitting unit 211e acquires a service message including service use information from the service use information generating unit 231b of the service system client simulator 231. The service message transmitting unit 211e transmits the acquired service message to the back-end server 400.

The control message transmitting unit 211f acquires a simulation control message including information on the speed state of the simulation from the remainder time rate calculating unit 211g. Also, the control message transmitting unit 211f acquires a simulation control message including the control state of the agent simulator 201 from the simulation operation controlling unit 211h. The control message transmitting unit 211f transmits the simulation control messages acquired from the remainder time rate calculating unit 211g and the simulation operation controlling unit 211h to the simulation conductor 320.

The remainder time rate calculating unit 211g acquires information including the reception time of the movement message from the movement message receiving unit 211a. In addition, the remainder time rate calculating unit 211g acquires information including the transmission completion time of the movement message from the movement message transmitting unit 211d. Further, the remainder time rate calculating unit 211g acquires the start time of calculation for updating the state of the ego-agent from the next time step state calculating unit 241d of the simulator core 241.

The remainder time rate calculating unit 211g outputs a simulation control message including the remainder time, the remainder time rate, and the delay time to the control message transmitting unit 211f. The remainder time, the remainder time rate, and the delay time are information on the speed state of the simulation. The simulation conductor 320, which has received the simulation control message including the above information, determines control contents to be instructed to the agent simulator 201. The control contents to be instructed to the agent simulator 201 is, for example, simulation speed, stopping the simulation, pausing the simulation, and restarting the simulation. The simulation conductor 320 creates a simulation control message that includes the control contents to be instructed and transmits it to the agent simulator 201.

The simulation operation controlling unit 211h acquires a simulation control message from the control message receiving unit 211c. The simulation operation controlling unit 211h controls the simulation operation of the agent simulator 201 in accordance with an instruction included in the simulation control message. For example, when the change of the time granularity of the simulation is instructed, the simulation operation controlling unit 211h changes the time granularity of the simulation by the agent simulator 201 from the initial value to the instructed time granularity. The initial value of the time granularity is stored as a set value in the agent simulator 201. The upper and lower limit values of the time granularity are stored in the simulation conductor 320 for each type of agent.

When the instruction content of the simulation control message is the simulation speed, the simulation operation controlling unit 211h accelerates or decelerates the simulation speed by changing the operating frequency of the 3D physical engine 221 and the simulator cores 241. For example, for the simulator core 241, the instructed simulation speed is output to the speed adjusting unit 241g of the simulator core 241. The simulation speed means a speed ratio of the flow of time in the virtual world 2 to the flow of time in the real world. When the stop of the simulation is instructed, the simulation operation controlling unit 211h stops the simulation by the agent simulator 201. When the stop of the simulation is instructed, the simulation operation controlling unit 211h stops the simulation. When the restart of the simulation is instructed, the simulation operation controlling unit 211h restarts the simulation. The simulation operation controlling unit 211h outputs a simulation control message including the current control state of the agent simulator 201 to the control message transmitting unit 211f.

3-1-3. Details of 3D Physical Engine

In the 3D physical engine 221, the surrounding agent state updating unit 221a acquires a movement message from the movement message receiving unit 211a. The movement message acquired from the movement message receiving unit 211a is a movement message transmitted from another agent simulator via the movement message dispatcher 310. The surrounding agent state updating unit 221a estimates the current state of a surrounding agent existing around the ego-agent based on the acquired movement message.

When the current state of the surrounding agent is estimated from the past state, the surrounding agent state updating unit 221a uses the past state of the surrounding agent stored in the log. For example, the current state of the surrounding agent can be estimated by linear extrapolation based on the latest two or more past states of the surrounding agent. If the number of past states of the surrounding agent is one, the only one past state may be estimated as the current state of the surrounding agent. The surrounding agent state updating unit 221a outputs the estimated current state of the surrounding agent to the visual information generating unit 221b and updates the log.

The visual information generating unit 221b acquires the current state of the surrounding agent from the surrounding agent state updating unit 221a. The visual information generating unit 221b generates peripheral information obtained by observation from the ego-agent based on the current state of the surrounding agent. Since the ego-agent is a pedestrian, peripheral information obtained by observation means visual information captured by the pedestrian's eyes. The visual information generating unit 221b outputs the generated visual information to the global movement policy determining unit 241a, the behavior determining unit 241b, and the service use behavior determining unit 241e of the simulator core 241.

The ego-agent state updating unit 221c acquires the state of the ego-agent in the next time step simulated by the simulator core 241 from the next time step state calculating unit 241d of the simulator core 241. The ego-agent state updating unit 221c updates the state of the ego-agent in the three-dimensional space based on the simulation result by the simulator core 241. The ego-agent state updating unit 221c outputs a movement message including the updated state of the ego-agent to the movement message transmitting unit 211d of the transmit/receive controller 211. The state of the ego-agent included in the movement message includes the location, direction, speed, acceleration in the current time step, and the location, direction, speed, and acceleration in the next time step. In addition, the ego-agent state updating unit 221c outputs information on the updated state of the ego-agent to the service use information generating unit 231b of the service system client simulator 231.

3-1-4. Details of Service System Client Simulator

In the service system client simulator 231, the service provision state information processing unit 231a acquires a service message from the service message receiving unit 211b. The service message acquired from the service message receiving unit 211b includes service provision state information. The service provision state information processing unit 231a processes the service provision state information, and acquires information on the state of the ego-agent as a user of the service system and input items to the service application of the user terminal. The information on the state of the ego-agent as a user is information presented to the user terminal, and the input items are information requested to input in order for the ego-agent to use the service. The service provision state information processing unit 231a outputs the information on the state of the ego-agent as a user and the input items to the service application of the user terminal to the global movement policy determining unit 241a and the service use behavior determining unit 241e of the simulator core 241.

The service use information generating unit 231b acquires the determination result of the service use behavior of the ego-agent from the service use behavior determining unit 241e of the simulator core 241. In addition, the service use information generating unit 231b acquires the state of the ego-agent in the three-dimensional space from the ego-agent state updating unit 221c of the 3D physical engine 221. The service use information generating unit 231b generates service use information based on the acquired information and updates the use state of the service of the ego-agent. The service use information generating unit 231b outputs a service message including the service use information to the service message transmitting unit 211e of the transmit/receive controller 211.

3-1-5. Details of Simulator Core

In the simulator core 241, the global movement policy determining unit 241a acquires visual information from the visual information generating unit 221b of the 3D physical engine 221. In addition, the global movement policy determining unit 241a acquires the information on the state of the ego-agent as a user and the input items to the service application of the user terminal from the service provision state information processing unit 231a of the service system client simulator 231. The global movement policy determining unit 241a determines a global movement policy of the ego-agent in the virtual world 2 based on the acquired information. The global movement policy determining unit 241a outputs the determined global movement policy to the behavior determining unit 241b.

The behavior determining unit 241b acquires the global movement policy from the global movement policy determining unit 241a, and acquires visual information from the visual information generating unit 221b of the 3D physical engine 221. The behavior determining unit 241b determines the behavior of the ego-agent by inputting the global movement policy and the visual information to a movement model 241c. The movement model 241c is a simulation model modeling how a pedestrian moves in accordance with surrounding conditions appearing in the eyes of the pedestrian under a certain movement policy. The behavior determining unit 241b outputs the determined behavior of the ego-agent to the next time step state calculating unit 241d.

The next time step state calculating unit 241d acquires the behavior of the ego-agent determined by the behavior determining unit 241b. The next time step state calculating unit 241d calculates the state of the ego-agent in the next time step based on the behavior of the ego-agent. The calculated state of the ego-agent includes the location, direction, speed, and acceleration of the ego-agent in the next time step. The next time step state calculating unit 241d outputs the calculated state of the ego-agent in the next time step to the ego-agent state updating unit 221c of the 3D physical engine 221. The next time step state calculating unit 241d outputs the start time of calculation for updating the state of the ego-agent to the remainder time rate calculating unit 211g of the transmit/receive controller 211.

The service use behavior determining unit 241e acquires the visual information from the visual information generating unit 221b of the 3D physical engine 221. In addition, the service use behavior determining unit 241e acquires the information on the state of the ego-agent as a user and the input items to the service application of the user terminal from the service provision state information processing unit 231a of the service system client simulator 231. The service use behavior determining unit 241e inputs the acquired information to a behavior model 241f to determine the behavior of the ego-agent as a user of the service system (service use behavior). The behavior model 241f is a simulation model that models how a user behaves in accordance with surrounding conditions appearing in the eyes of the user when information on the service is presented to the user and input to the service application of the user terminal is requested. The service use behavior determining unit 241e outputs the determined service use behavior to the service use information generating unit 231b.

The speed adjusting unit 241g acquires the simulation speed from the simulation operation controlling unit 211h. The simulation speed acquired from the simulation operation controlling unit 211h is the simulation speed instructed by the simulation conductor 320. The speed adjusting unit 241g accelerates or decelerates the simulation speed of the ego-agent by the simulator core 241 in accordance with an instruction from the simulation conductor 320.

3-2. Agent Simulator for Autonomous Robot/Vehicle Agent

Figure 14:
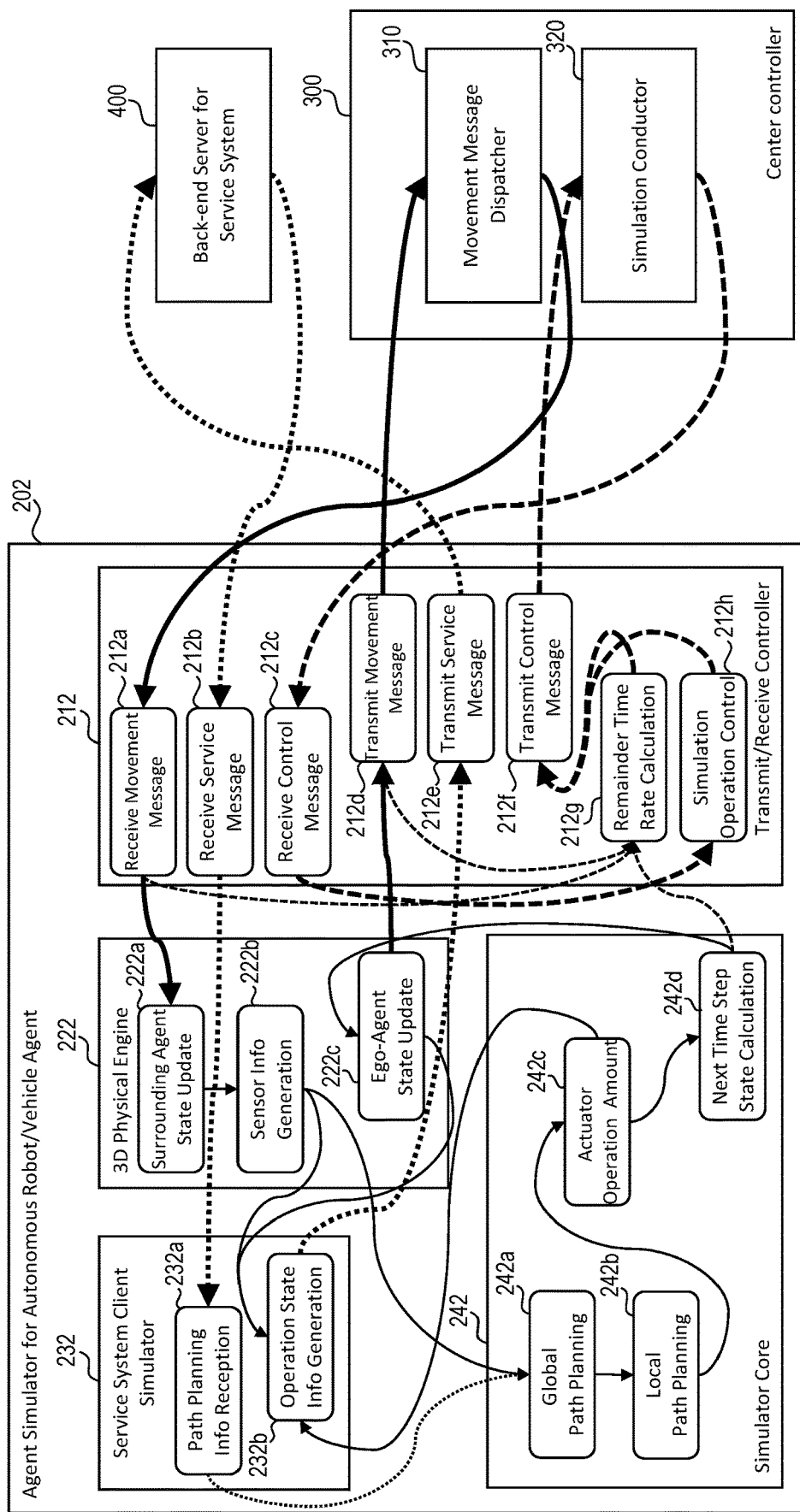
FIG. 14 is a block diagram illustrating a configuration and flows of information of an agent simulator for an autonomous mobile agent according to the embodiment of the present disclosure.

FIG. 14 is a block diagram illustrating a configuration and flows of information of an agent simulator 202 for an autonomous robot/vehicle agent. The autonomous robot/vehicle agent is an agent for autonomous robot or autonomous vehicle used to provide services in the service system to which the back-end server 400 relates. Hereinafter, the overall configuration of the agent simulator 202 for the autonomous robot/vehicle agent, the details of each part, and flows of information in the agent simulator 202 will be described below.

3-2-1. Overall Configuration of Agent Simulator for Autonomous Robot/Vehicle Agent The agent simulator 202 includes, as its function, a transmit/receive controller 212, a 3D physical engine 222, a service system client simulator 232, and a simulator core 242. These functions are conceptually included in the transmit/receive controller 210, the 3D physical engine 220, the service system client simulator 230, and the simulator core 240, respectively.

The transmit/receive controller 212 includes a movement message receiving unit 212a, a service message receiving unit 212b, and a control message receiving unit 212c as functions for receiving various messages. The transmit/receive controller 212 includes a movement message transmitting unit 212d, a service message transmitting unit 212e, and a control message transmitting unit 212f as functions for transmitting various messages. The transmit/receive controller 212 further includes a remainder time rate calculating unit 212g and a simulation operation controlling unit 212h. Each of the units 212a to 212h comprising the transmit/receive controller 211 is a program or a part of a program. It should be noted that the description in each block describes a representative function of each unit and does not necessarily coincide with the name of each unit.

The 3D physical engine 222 includes, as its functions, a surrounding agent state updating unit 222a, a sensor information generating unit 222b, and an ego-agent state updating unit 222c. Each of the units 222a, 222b, 222c comprising the 3D physical engine 222 is a program or a part of a program. It should be noted that the description in each block describes a representative function of each unit and does not necessarily coincide with the name of each unit.

The service system client simulator 232 includes, as its functions, a path planning information receiving unit 232a and an operation state information generating unit 232b. Each of the units 232a and 232b comprising the service system client simulator 232 is a program or a part of a program. It should be noted that the description in each block describes a representative function of each unit and does not necessarily coincide with the name of each unit.

The simulator core 242 includes, as its functions, a global path planning unit 242a, a local path planning unit 242b, an actuator operation amount determining unit 242c, and a next time step state calculating unit 242d. Each of the units 242a, 242b, 242c, 242d comprising the simulator core 242 is a program or a part of a program. It should be noted that the description in each block describes a representative function of each unit and does not necessarily coincide with the name of each unit.

3-2-2. Details of Transmit/Receive Controller

In the transmit/receive controller 212, the movement message receiving unit 212a receives a movement message from the movement message dispatcher 310. The movement message receiving unit 212a outputs the received movement message to the surrounding agent state updating unit 222a of the 3D physical engine 222. In addition, the movement message receiving unit 212a outputs information including the time at which the movement message is received to the remainder time rate calculating unit 212g.

The service message receiving unit 212b receives a service message from the back-end server 400. The service message receiving unit 212b outputs the received service message to the path planning information receiving unit 232a of the service system client simulator 232.

The control message receiving unit 212c receives a simulation control message from the simulation conductor 320. The control message receiving unit 212c outputs the received simulation control message to the simulation operation controlling unit 212h.

The movement message transmitting unit 212d acquires a movement message including the current state of the ego-agent from the ego-agent state updating unit 222c of the 3D physical engine 222. The movement message transmitting unit 212d transmits the acquired movement message to the movement message dispatcher 310. In addition, the movement message transmitting unit 212d transmits information including the transmission completion time of the movement message to the remainder time rate calculating unit 212g.

The service message transmitting unit 212e acquires a service message including operation state information from the operation state information generating unit 232b of the service system client simulator 232. The service message transmitting unit 212e transmits the acquired service message to the back-end server 400.

The control message transmitting unit 212f acquires a simulation control message including information on the speed state of the simulation from the remainder time rate calculating unit 212g. Also, the control message transmitting unit 212f acquires a simulation control message including the control state of the agent simulator 202 from the simulation operation controlling unit 212h. The control message transmitting unit 212f transmits the simulation control messages acquired from the remainder time rate calculating unit 212g and the simulation operation controlling unit 212h to the simulation conductor 320.

The remainder time rate calculating unit 212g acquires information including the reception time of the movement message from the movement message receiving unit 212a. In addition, the remainder time rate calculating unit 212g acquires information including the transmission completion time of the movement message from the movement message transmitting unit 212d. Further, the remainder time rate calculating unit 212g acquires the start time of calculation for updating the state of the ego-agent from the next time step state calculating unit 242d of the simulator core 242.

The remainder time rate calculating unit 212g calculates the remainder time, the remainder time rate, and the delay time based on the acquired information by the above-described equations. The remainder time rate calculating unit 212g outputs a simulation control message including the remainder time, the remainder time rate, and the delay time to the control message transmitting unit 212f. Upon receiving the simulation control message including the above information, the simulation conductor 320 creates a simulation control message including control contents to be instructed to the agent simulator 202 and transmits the simulation control message to the agent simulator 202.

The simulation operation controlling unit 212h acquires a simulation control message from the control message receiving unit 212c. The simulation operation controlling unit 212h controls the simulation operation of the agent simulator 202 in accordance with an instruction included in the simulation control message. For example, when the change of the time granularity of the simulation is instructed, the simulation operation controlling unit 212h changes the time granularity of the simulation by the agent simulator 202 from the initial value to the instructed time granularity. The initial value of the time granularity is stored as a set value in the agent simulator 202. The upper and lower limit values of the time granularity are stored in the simulation conductor 320 for each type of agent.

When the instruction content of the simulation control message is the simulation speed, the simulation operation controlling unit 212h changes the operating frequency of the 3D physical engine 222 and the simulator cores 242 in accordance with the instructed simulation speed, and accelerates or decelerates the operation speed of the agent simulator 202. When the stop of the simulation is instructed, the simulation operation controlling unit 212h stops the simulation by the agent simulator 202. When the stop of the simulation is instructed, the simulation operation controlling unit 212h stops the simulation. When the restart of the simulation is instructed, the simulation operation controlling unit 212h restarts the simulation. The simulation operation controlling unit 212h outputs a simulation control message including the current control state of the agent simulator 202 to the control message transmitting unit 212f.

3-2-3. Details of 3D Physical Engine

In the 3D physical engine 222, the surrounding agent state updating unit 222a acquires a movement message from the movement message receiving unit 212a. The movement message acquired from the movement message receiving unit 212a is a movement message transmitted from another agent simulator via the movement message dispatcher 310. The surrounding agent state updating unit 222a estimates the current state of a surrounding agent existing around the ego-agent based on the acquired movement message.

When the current state of the surrounding agent is estimated from the past state, the surrounding agent state updating unit 222a uses the past state of the surrounding agent stored in the log. The method of estimating the current state of the surrounding agent using the past state is as described above. The surrounding agent state updating unit 222a outputs the estimated current state of the surrounding agent to the sensor information generating unit 222b and updates the log.

The sensor information generating unit 222b acquires the current state of the surrounding agent from the surrounding agent state updating unit 222a. The sensor information generating unit 222b generates peripheral information obtained by observation from the ego-agent based on the current state of the surrounding agent. Since the ego-agent is an autonomous robot or an autonomous vehicle, peripheral information obtained by observation means sensor information captured by a sensor mounted on the autonomous robot or the autonomous vehicle. The sensor information generating unit 222b outputs the generated sensor information to the global path planning unit 242a of the simulator core 242 and the operation state information generating unit 232b of the service system client simulator 232.

The ego-agent state updating unit 222c acquires the state of the ego-agent in the next time step calculated by the simulator core 242 from the next time step state calculating unit 242d of the simulator core 242. The ego-agent state updating unit 222c updates the state of the ego-agent in the three-dimensional space based on the calculation result by the simulator core 242. The ego-agent state updating unit 222c outputs a movement message including the updated state of the ego-agent to the movement message transmitting unit 212d of the transmit/receive controller 212. The state of the ego-agent included in the movement message includes the location, direction, speed, acceleration in the current time step, and the location, direction, speed, and acceleration in the next time step. In addition, the ego-agent state updating unit 222c outputs the updated information on the state of the ego-agent to the operation state information generating unit 232b of the service system client simulator 232.

3-2-4. Details of Service System Client Simulator

In the service system client simulator 232, the path planning information receiving unit 232a acquires a service message from the service message receiving unit 211b. The service message obtained from the service message receiving unit 212b includes operation instruction information for the service system to provide services using the autonomous robot/vehicle and information related to other service systems. The path planning information receiving unit 232a outputs the operation instruction information and the other service system information to the global path planning unit 242a of the simulator core 242.

The operation state information generating unit 232b acquires the actuator operation amount in the next time step of the ego-agent from the actuator operation amount determining unit 242c of the simulator core 242. Also, the operation state information generating unit 232b acquires the sensor information from the sensor information generating unit 222b of the 3D physical engine 222, and acquires the state of the ego-agent in the three-dimensional space from the ego-agent state updating unit 222c. The operation state information generating unit 232b generates operation state information representing the operation state of the ego-agent related to the provision of the service based on the acquired information. The operation state information generating unit 232b outputs a service message including the operation state information to the service message transmitting unit 212e of the transmit/receive controller 212.

3-2-5. Derails of Simulator Core

In the simulator core 242, the global path planning unit 242a acquires sensor information from the sensor information generating unit 222b of the 3D physical engine 222. The global path planning unit 242a acquires the operation instruction information and the other service system information from the path planning information receiving unit 232a of the service system client simulator 232. The global path planning unit 242a plans the global path of the ego-agent in the virtual world 2 based on the acquired information. The global path refers to the path from the current location of the ego-agent to the target point. Since the information acquired from the sensor information generating unit 222b and the path planning information receiving unit 232a changes every time, the global path planning unit 242a determines a global path plan for each time step. The global path planning unit 242a outputs the determined global path plan to the local path planning unit 242b.

The local path planning unit 242b acquires the global path plan from the global path planning unit 242a. The local path planning unit 242b determines a local path plan based on the global path plan. The local path means, for example, a path from the current time point to a time point after a predetermined time step, or a path from the current position to a position separated by a predetermined distance. A local path plan is represented, for example, by a set of locations to be traversed by the ego-agent and a speed or acceleration at each location. The local path planning unit 242b outputs the determined local path plan to the actuator operation amount determining unit 242c.

The actuator operation amount determining unit 242c acquires the local path plan from the local path planning unit 242b. The actuator operation amount determining unit 242c determines actuator operation amounts of the ego-agent in the next time step based on the local path plan. The actuators here include actuators that control the direction, speed, and acceleration of the ego-agent. When the ego-agent is an autonomous robot/vehicle traveling on wheels, for example, actuators such as a braking device, a driving device, and a steering device are operated. The actuator operation amount determining unit 242c outputs the determined actuator operation amounts to the next time step state calculating unit 242d and the operation state information generating unit 232b of the service system client simulator 232.

The next time step state calculating unit 242d acquires the actuator operation amounts determined by the actuator operation amount determining unit 242c. The next time step state calculating unit 242d calculates the state of the ego-agent in the next time step based on the actuator operation amounts. The calculated state of the ego-agent includes the location, direction, speed, and acceleration of the ego-agent in the next time step. The next time step state calculating unit 242d outputs the calculated state of the ego-agent in the next time step to the ego-agent state updating unit 222c of the 3D physical engine 222. The next time step state calculating unit 242d outputs the start time of calculation for updating the state of the ego-agent to the remainder time rate calculating unit 212g of the transmit/receive controller 212.

3-3. Agent Simulator for VR Pedestrian Agent

Figure 15:
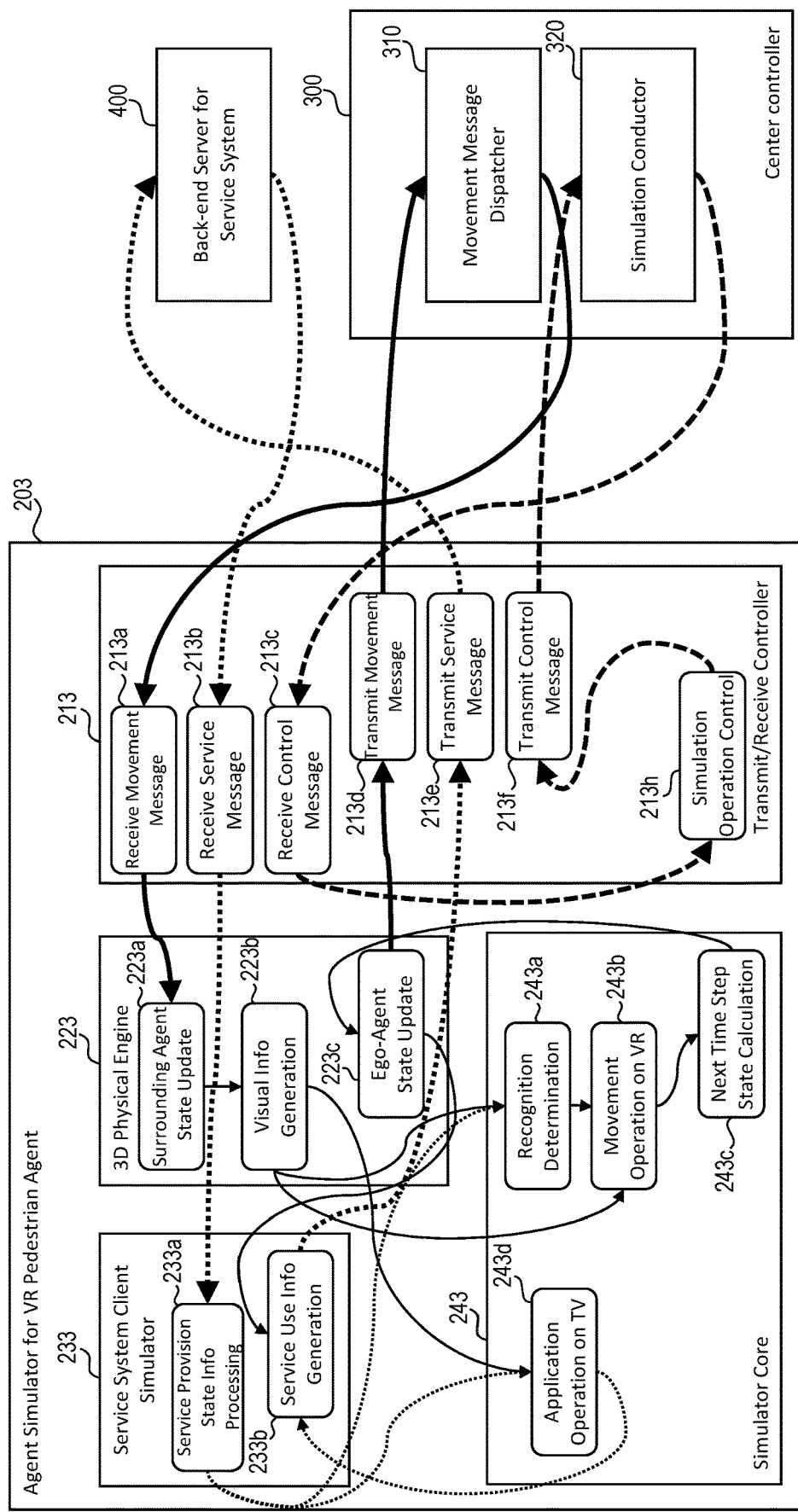
FIG. 15 is a block diagram illustrating a configuration and flows of information of an agent simulator for a VR pedestrian agent according to the embodiment of the present disclosure.

FIG. 15 is a block diagram illustrating a configuration and a flow of information of an agent simulator 203 for a VR pedestrian agent. The VR pedestrian agent is a pedestrian agent for a real person to participate in the virtual world 2 which is the target of simulation by using the VR (Virtual Reality) system. Hereinafter, the overall configuration of the agent simulator 203 for the VR pedestrian agent, the details of each part, and the flow of information in the agent simulator 203 will be described below.

3-3-1. Overall Configuration of Agent Simulator for VR Pedestrian Agent

The agent simulator 203 includes, as its function, a transmit/receive controller 213, a 3D physical engine 223, a service system client simulator 233, and a simulator core 243. These functions are conceptually included in the transmit/receive controller 210, the 3D physical engine 220, the service system client simulator 230, and the simulator core 240, respectively.

The transmit/receive controller 213 includes a movement message receiving unit 213a, a service message receiving unit 213b, and a control message receiving unit 213c as functions for receiving various messages. The transmit/receive controller 213 includes a movement message transmitting unit 213d, a service message transmitting unit 213e, and a control message transmitting unit 213f as functions for transmitting various messages. The transmit/receive controller 213 further includes a simulation operation controlling unit 213h. Each of the units 213a to 213f and 213h comprising the transmit/receive controller 213 is a program or a part of a program. It should be noted that the description in each block describes a representative function of each unit and does not necessarily coincide with the name of each unit.

The 3D physical engine 223 includes, as its functions, a surrounding agent state updating unit 223a, a visual information generating unit 223b, and an ego-agent state updating unit 223c. Each of the units 223a, 223b, 223c comprising the 3D physical engine 223 is a program or a part of a program. It should be noted that the description in each block describes a representative function of each unit and does not necessarily coincide with the name of each unit.

The service system client simulator 233 includes, as its functions, a service provision state information processing unit 233a and a service use information generating unit 233b. Each of the units 233a and 233b comprising the service system client simulator 231 is a program or a part of a program. It should be noted that the description in each block describes a representative function of each unit and does not necessarily coincide with the name of each unit.

The simulator core 243 includes, as its functions, a recognition determination information presenting unit 243a, a movement operation accepting unit 243b, a next time step state calculating unit 243c, and an application operation accepting unit 243d. Each of the units 243a, 243b, 243c, 243d comprising the simulator core 243 is a program or a part of a program. It should be noted that the description in each block describes a representative function of each unit and does not necessarily coincide with the name of each unit.

3-3-2. Details of Transmit/Receive Controller

In the transmit/receive controller 213, the movement message receiving unit 213a receives a movement message from the movement message dispatcher 310. The movement message receiving unit 213a outputs the received movement message to the surrounding agent state updating unit 223a of the 3D physical engine 223.

The service message receiving unit 213b receives a service message from the back-end server 400. The service message receiving unit 213b outputs the received service message to the service provision state information processing unit 233a of the service system client simulator 233.

The control message receiving unit 213c receives a simulation control message from the simulation conductor 320. The control message receiving unit 213c outputs the received simulation control message to the simulation operation controlling unit 213h.

The movement message transmitting unit 213d acquires a movement message including the current state of the ego-agent from the ego-agent state updating unit 223c of the 3D physical engine 223. The movement message transmitting unit 213d transmits the acquired movement message to the movement message dispatcher 310.

The service message transmitting unit 213e acquires a service message including service use information from the service use information generating unit 233b of the service system client simulator 233. The service message transmitting unit 213e transmits the acquired service message to the back-end server 400.

The control message transmitting unit 213f acquires a simulation control message including the control state of the agent simulator 203 from the simulation operation controlling unit 213h. The control message transmitting unit 213f transmits the simulation control message acquired from the simulation operation controlling unit 213h to the simulation conductor 320.

The simulation operation controlling unit 213h acquires a simulation control message from the control message receiving unit 213c. The simulation operation controlling unit 213h controls the simulation operation of the agent simulator 203 in accordance with an instruction included in the simulation control message. When the VR pedestrian agent does not satisfy the participation condition in the virtual world 2, the simulation conductor 320 instructs the agent simulator 203 to stop the simulation.

The agent simulators 201, 202 described above and the agent simulator 204 described later can change the simulation speed as needed. However, if the simulation speed is changed, a real-world participant participating in the virtual world 2 through the VR pedestrian agent may feel a strong discomfort against the flow of time different from the real world. Therefore, in the MAS system 100, participation of the VR pedestrian agent to the virtual world 2 is allowed on the condition that the simulation is being performed in real time. When the simulation speed is accelerated or decelerated more than the flow of time in the real world, the simulation conductor 320 stops the simulation by the agent simulator 203. The simulation operation controlling unit 213h outputs a simulation control message including the current control state of the agent simulator 203 to the control message transmitting unit 213f.

3-3-3. Details of 3D Physical Engine

In the 3D physical engine 223, the surrounding agent state updating unit 223a acquires a movement message from the movement message receiving unit 213a. The movement message acquired from the movement message receiving unit 213a is a movement message transmitted from another agent simulator via the movement message dispatcher 310.

The surrounding agent state updating unit 223a estimates the current state of a surrounding agent existing around the ego-agent based on the acquired movement message.

When the current state of the surrounding agent is estimated from the past state, the surrounding agent state updating unit 223a uses the past state of the surrounding agent stored in the log. The method of estimating the current state using the past state of the surrounding agent is as described above. The surrounding agent state updating unit 223a outputs the estimated current state of the surrounding agent to the visual information generating unit 223b and updates the log.

The visual information generating unit 223b acquires the current state of the surrounding agent from the surrounding agent state updating unit 223a. The visual information generating unit 223b generates peripheral information obtained by observation from the ego-agent based on the current state of the surrounding agent. Since the ego-agent is a pedestrian, peripheral information obtained by observation means visual information captured by the pedestrian's eyes. The visual information generating unit 223b outputs the generated visual information to the recognition determination information presenting unit 243a and the movement operation accepting unit 243b of the simulator core 243.

The ego-agent state updating unit 223c acquires the state of the ego-agent in the next time step calculated by the simulator core 243 from the next time step state calculating unit 243c of the simulator core 243. The ego-agent state updating unit 223c updates the state of the ego-agent in the three-dimensional space based on the calculation result by the simulator core 243. The ego-agent state updating unit 223c outputs a movement message including the updated state of the ego-agent to the movement message transmitting unit 213d of the transmit/receive controller 213. The state of the ego-agent included in the movement message includes the location, direction, speed, acceleration in the current time step, and the location, direction, speed, and acceleration in the next time step. In addition, the ego-agent state updating unit 223c outputs information on the updated state of the ego-agent to the service use information generating unit 233b of the service system client simulator 233.

3-3-4. Details of Service System Client Simulator

In the service system client simulator 233, the service provision state information processing unit 233a acquires a service message from the service message receiving unit 213b. The service message acquired from the service message receiving unit 213b includes service provision state information. The service provision state information processing unit 233a processes the service provision state information, and acquires information on the state of the ego-agent as a user of the service system and input items to the service application of the user terminal. The information on the state of the ego-agent as a user is information presented to the user terminal, and the input items are information requested to input in order for the ego-agent to use the service. The service provision state information processing unit 233a outputs the information on the state of the ego-agent as a user and the input items to the service application of the user terminal to the recognition determination information presenting unit 243a and the application operation accepting unit 243d of the simulator core 243.

The service use information generating unit 233b acquires the operation of the service application on the VR by a real participant participating in the virtual world 2 via the VR pedestrian agent from the application operation accepting unit 243d of the simulator core 243. In addition, the service use information generating unit 233b acquires the state of the ego-agent in the three-dimensional space from the ego-agent state updating unit 223c of the 3D physical engine 223. The service use information generating unit 233b generates service use information based on the acquired information and updates the use state of the service of the ego-agent. The service use information generating unit 233b outputs a service message including the service use information to the service message transmitting unit 213e of the transmit/receive controller 213.

3-3-5. Details of Simulator Core

In the simulator core 243, the recognition determination information presenting unit 243a acquires visual information from the visual information generating unit 223b of the 3D physical engine 223. In addition, the recognition determination information presenting unit 243a acquires the information on the state of the ego-agent as a user and the input items to the service application of the user terminal from the service provision state information processing unit 233a of the service system client simulator 231. The acquired information is information for recognition determination for the real participant participating in the virtual world 2 through the VR pedestrian agent. The recognition determination information presenting unit 243a presents the recognition determination information to the real participant through the VR system.

The movement operation accepting unit 243b acquires visual information from the visual information generating unit 223b of the 3D physical engine 223. The movement operation accepting unit 243b accepts a movement operation on the VR by the real participant while presenting the visual information to the real participant through the VR system. The movement operation accepting unit 243b outputs the accepted movement operation on the VR by the real participant to the next time step state calculating unit 243d.

The next time step state calculating unit 243d acquires the movement operation on the VR by the real participant from the movement operation accepting unit 243b. The next time step state calculating unit 243d calculates the state of the ego-agent in the next time step based on the movement operation on the VR by the real participant. The calculated state of the ego-agent includes the location, direction, speed, and acceleration of the ego-agent in the next time step. The next time step state calculating unit 243d outputs the calculated state of the ego-agent in the next time step to the ego-agent state updating unit 223c of the 3D physical engine 223.

The application operation accepting unit 243d acquires visual information from the visual information generating unit 223b of the 3D physical engine 223. In addition, the application operation accepting unit 243d acquires the information on the state of the ego-agent as a user and the input items to the service application of the user terminal from the service provision state information processing unit 233a of the service system client simulator 233. The application operation accepting unit 243d accepts the operation of the service application on the VR by the real participant while presenting the acquired information to the real participant through the VR system. The application operation accepting unit 243d outputs the accepted operation of the service application on the VR by the real participant to the service use information generating unit 233b of the service system client simulator 233.

3-4. Agent Simulator for Roadside Sensor Agent

Figure 16:
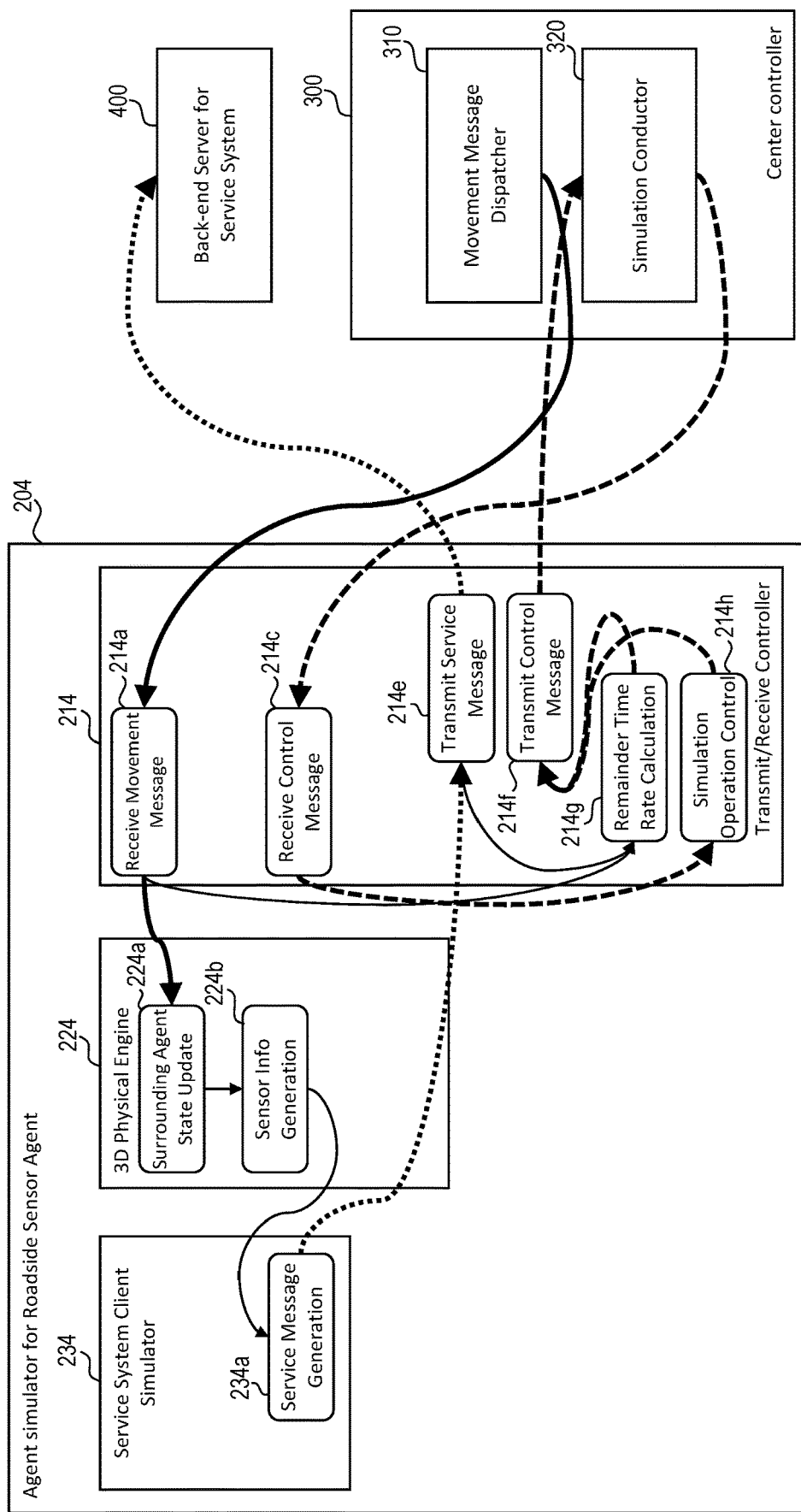
FIG. 16 is a block diagram illustrating a configuration and flows of information of an agent simulator for a roadside sensor agent according to the embodiment of the present disclosure.

FIG. 16 is a block diagram illustrating the configuration and flows of information of an agent simulator 204 for a roadside sensor agent. The roadside sensor agent is an agent of a roadside sensor used for acquisition of location information of an autonomous robot/vehicle agent in the virtual world 2. The location information of the autonomous robot/vehicle agent acquired by the roadside sensor agent is used in the service system associated with the back-end server 400. Hereinafter, the overall configuration of the agent simulator 204 for the roadside sensor agent, the details of each part, and flows of information in the agent simulator 204 will be described.

3-4-1. Overall Configuration of Agent Simulator for Roadside Sensor Agent

The agent simulator 204 includes, as its function, a transmit/receive controller 214, a 3D physical engine 224, and a service system client simulator 234. These functions are conceptually included in the transmit/receive controllers 210, 3D physical engine 220, and the simulator core 240, respectively. The agent simulator 204 does not have a simulator core unlike other agent simulators.

The transmit/receive controller 214 includes a movement message receiving unit 214a and a control message receiving unit 214b as functions for receiving various messages. The transmit/receive controller 214 includes a service message transmitting unit 214e and a control message transmitting unit 214f as functions for transmitting various messages. The transmit/receive controller 214 further includes a remainder time rate calculating unit 214g and a simulation operation controlling unit 214h. Each of the units 214a, 214c and 214e to 214h comprising the transmit/receive controller 214 is a program or a part of a program. It should be noted that the description in each block describes a representative function of each unit and does not necessarily coincide with the name of each unit.

The 3D physical engine 224 includes, as its function, a surrounding agent state updating unit 224a and a sensor information generating unit 224b. Each of the units 224a, 224b comprising the 3D physical engine 224 is a program or a part of a program. It should be noted that the description in each block describes a representative function of each unit and does not necessarily coincide with the name of each unit.

The service system client simulator 234 includes a service message generating unit 234a as a function thereof. The service message generator 234a comprising the service system client simulator 234 is a program or a part of a program. It should be noted that the description in each block describes a representative function of each unit and does not necessarily coincide with the name of each unit.

3-4-2. Details of Transmit/Receive Controller

In the transmit/receive controller 214, the movement message receiving unit 214a receives a movement message from the movement message dispatcher 310. The movement message receiving unit 214a outputs the received movement message to the surrounding agent state updating unit 224a of the 3D physical engine 224. In addition, the movement message receiving unit 214a outputs information including the time at which the movement message is received to the remainder time rate calculating unit 214g.

The control message receiving unit 214c receives a simulation control message from the simulation conductor 320. The control message receiving unit 214c outputs the received simulation control message to the simulation operation controlling unit 214h.

The service message transmitting unit 214e acquires a service message including sensor information from the service message generating unit 234a of the service system client simulator 234. The service message transmitting unit 214e transmits the acquired service message to the back-end server 400.

The control message transmitting unit 214f acquires a simulation control message including information on the speed state of the simulation from the remainder time rate calculating unit 214g. Also, the control message transmitting unit 214f acquires a simulation control message including the control state of the agent simulator 204 from the simulation operation controlling unit 214h. The control message transmitting unit 214f transmits the simulation control messages acquired from the remainder time rate calculating unit 214g and the simulation operation controlling unit 214h to the simulation conductor 320.

The remainder time rate calculating unit 214g acquires information including the reception time of the movement message from the movement message receiving unit 214a. The remainder time rate calculating unit 214g acquires information including the transmission completion time of the service message from the service message transmitting unit 214e. The remainder time rate calculating unit 214g calculates the remainder time, the remainder time rate, and the delay time based on the acquired information by the above-described equations. However, in the calculation of the residual time and the residual time rate, the calculated value calculated from the operating frequency of the agent simulator 204 is used for Ta (N+1) and Ta (N). In addition, the transmission completion time of the service message is used in place of the transmission completion time of the movement message in the current time step in Td(N).

The remainder time rate calculating unit 214g outputs a simulation control message including the remainder time, the remainder time rate, and the delay time to the control message transmitting unit 214f. Upon receiving the simulation control message including the above information, the simulation conductor 320 creates a simulation control message including the control contents to be instructed to the agent simulator 204, and transmits the simulation control message to the agent simulator 204.

The simulation operation controlling unit 214h acquires a simulation control message from the control message receiving unit 214c. The simulation operation controlling unit 214h controls the simulation operation of the agent simulator 204 in accordance with an instruction included in the simulation control message. For example, when the change of the time granularity of the simulation is instructed, the simulation operation controlling unit 214h changes the time granularity of the simulation by the agent simulator 204 from the initial value to the instructed time granularity. The initial value of the time granularity is stored as a set value in the agent simulator 204. The upper and lower limit values of the time granularity are stored in the simulation conductor 320 for each type of agent.

When the instruction content of the simulation control message is the simulation speed, the simulation operation controlling unit 214h changes the operating frequency of the 3D physical engine 224 in accordance with the instructed simulation speed, and accelerates or decelerates the operation speed of the agent simulator 204. When the stop of the simulation is instructed, the simulation operation controlling unit 214h stops the simulation by the agent simulator 204.

When the stop of the simulation is instructed, the simulation operation controlling unit 214h stops the simulation. When the restart of the simulation is instructed, the simulation operation controlling unit 214h restarts the simulation. The simulation operation controlling unit 214h outputs a simulation control message including the current control state of the agent simulator 204 to the control message transmitting unit 214f.

3-4-3. Details of 3D Physical Engine

In the 3D physical engine 224, the surrounding agent state updating unit 224a acquires a movement message from the movement message receiving unit 214a. The movement message acquired from the movement message receiving unit 214a is a movement message transmitted from another agent simulator via the movement message dispatcher 310. The surrounding agent state updating unit 224a estimates the current state of a surrounding agent existing around the ego-agent based on the acquired movement message.

When the current state of the surrounding agent is estimated from the past state, the surrounding agent state updating unit 224a uses the past state of the surrounding agent stored in the log. The method of estimating the current state using the past state of the surrounding agent is as described above. The surrounding agent state updating unit 224a outputs the estimated current state of the surrounding agent to the sensor information generating unit 224b and updates the log.

The sensor information generating unit 224b acquires the current state of the surrounding agent from the surrounding agent state updating unit 224a. The sensor information generating unit 224b generates peripheral information obtained by observation from the ego-agent based on the current state of the surrounding agent. Since the ego-agent is a non-moving roadside sensor like a camera, peripheral information obtained by observation means sensor information captured by the roadside sensor. The sensor information generating unit 224b outputs the generated sensor information to the service message generating unit 234a of the service system client simulator 234.

3-4-4. Details of Service System Client Simulator

In the service system client simulator 234, the service message generator 234a acquires sensor information from the sensor information generator 224b of the 3D physical engine 224. The service message generating unit 234a outputs a service message including the acquired sensor information to the service message transmitting unit 214e of the transmit/receive controller 214.

4. Aggregation and Evaluation of Simulation Results by MAS System

Figure 17:
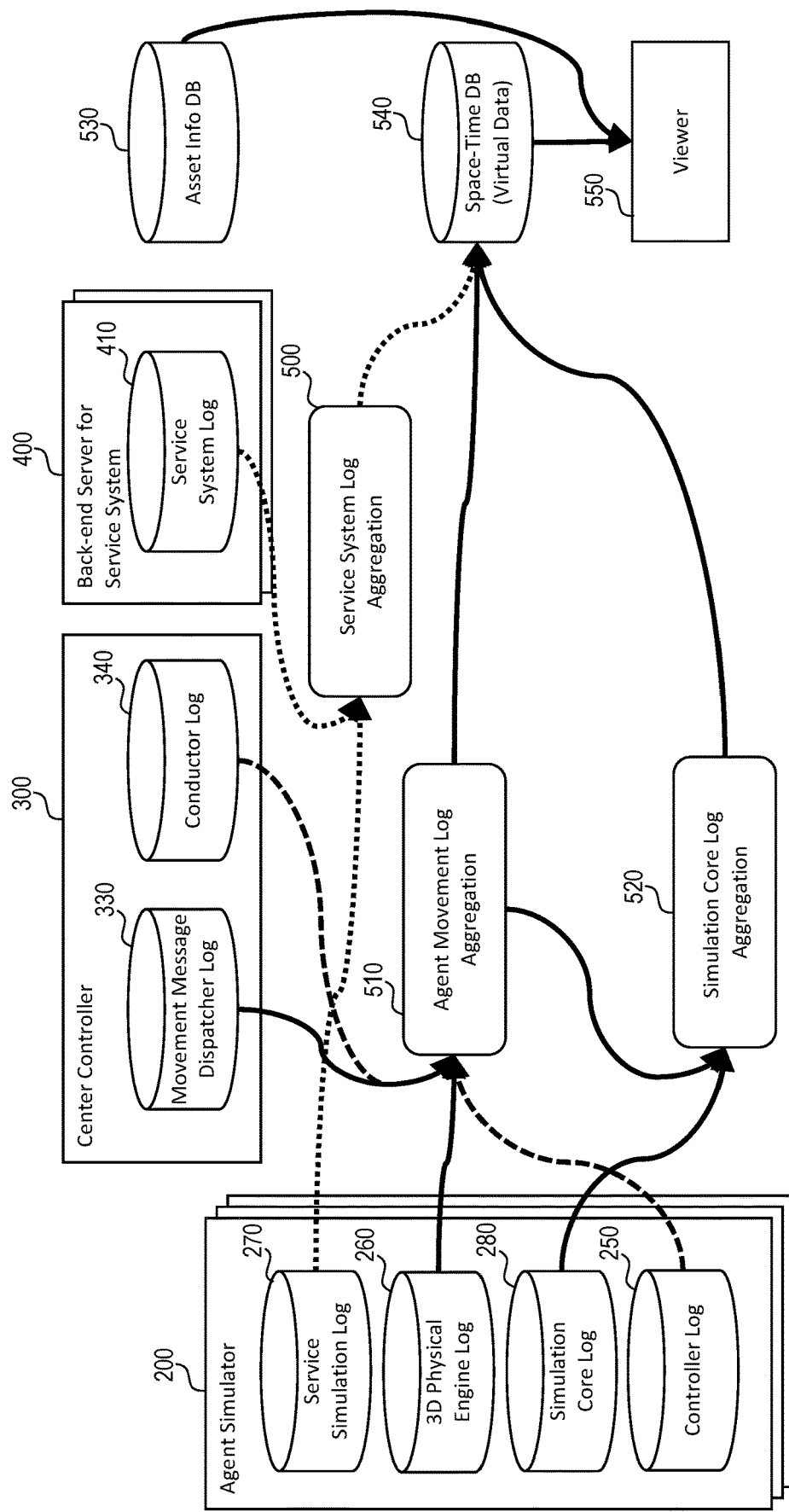
FIG. 17 is a block diagram illustrating a configuration for aggregation and evaluation of simulation results by the multi-agent simulation system according to the embodiment of the present disclosure.

By performing the simulation with the MAS system 100, various data about the target world of the simulation can be obtained. FIG. 17 shows a configuration for aggregating and evaluating simulation results by the MAS system 100.

The MAS system 100 provides a data logger at each location for storing a log of the simulated data. The agent simulator 200 is provided with a data logger 250, 260, 270, 280. The data logger 250 stores data logs in the transmit/receive controller 210 (controller logs). The data logger 260 stores data logs in the 3D physical engine 220 (3D physical engine logs). The data logger 270 stores data logs in the service system client simulator 230 (service simulation logs). The data logger 280 stores data logs in the simulator core 240 (simulation core logs).

The center controller 300 is provided with a data logger 330, 340. The data logger 330 stores data logs in the movement message dispatcher 310 (movement message dispatcher logs). The data logger 340 stores data logs in the simulation conductor 320 (conductor logs).

The back-end server 400 is provided with a data logger 410. The data logger 410 stores data logs in the back-end server 400 (service system logs).

If the simulation is stopped, the simulation conductor 320 can rewind and restart the simulation from any time in the past by using the data logs stored in each of the data loggers described above.

The MAS system 100 includes a service system log aggregating unit 500, an agent movement log aggregating unit 510, a simulation core log aggregating unit 520, an asset information database 530, a space-time database 540, and a viewer 550. They are installed on a computer for evaluation of simulation results.

The service system log aggregating unit 500 collects data logs from the data logger 270, 410. These data logs collected in the service system log aggregating unit 500 are data logs related to the service system. From these data logs, it is possible to evaluate whether the service was properly provided. It is also possible to evaluate the points of interest in providing services, including the utilization rate of service resources such as logistics robots.

The agent movement log aggregating unit 510 collects data logs from the data logger 250, 260, 330, 340. These data logs collected in the agent movement log aggregating unit 510 are data logs related to agent movement. From these data logs, the correct operation of the agent can be confirmed. It is also possible to check for problems such as overlapping agents. When an error occurs during the simulation, the time range in which the simulation content is assumed to be valid can be output from the data logs.

The simulation core log aggregating unit 520 collects data logs from the data logger 280 and the agent movement log aggregating unit 510. These data logs collected in the simulation core log aggregating unit 520 are data logs related to the points of interest in the simulation. From these data logs, it is possible to evaluate the points of interest such as the density of a person if the simulation is about a pedestrian, and the internal judgment result if the simulation is about a robot.

The asset information database 530 stores BIM/CIM data or three-dimensional information of a fixed object such as a building converted from BIM/CIM data and stores three-dimensional information of each agent.

The space-time database 540 stores virtual data for simulation. The evaluation results based on the data logs aggregated by the service system log aggregating unit 500, the agent movement log aggregating unit 510, and the simulation core log aggregating unit 520 are reflected to the virtual data in the space-time database 540.

The viewer 550 displays the virtual world 2 on the monitor using the three-dimensional information of the fixed object and the agent stored in the asset information database 530 and the virtual data stored in the space-time database 540.

5. Physical Configuration of MAS System

Figure 18:
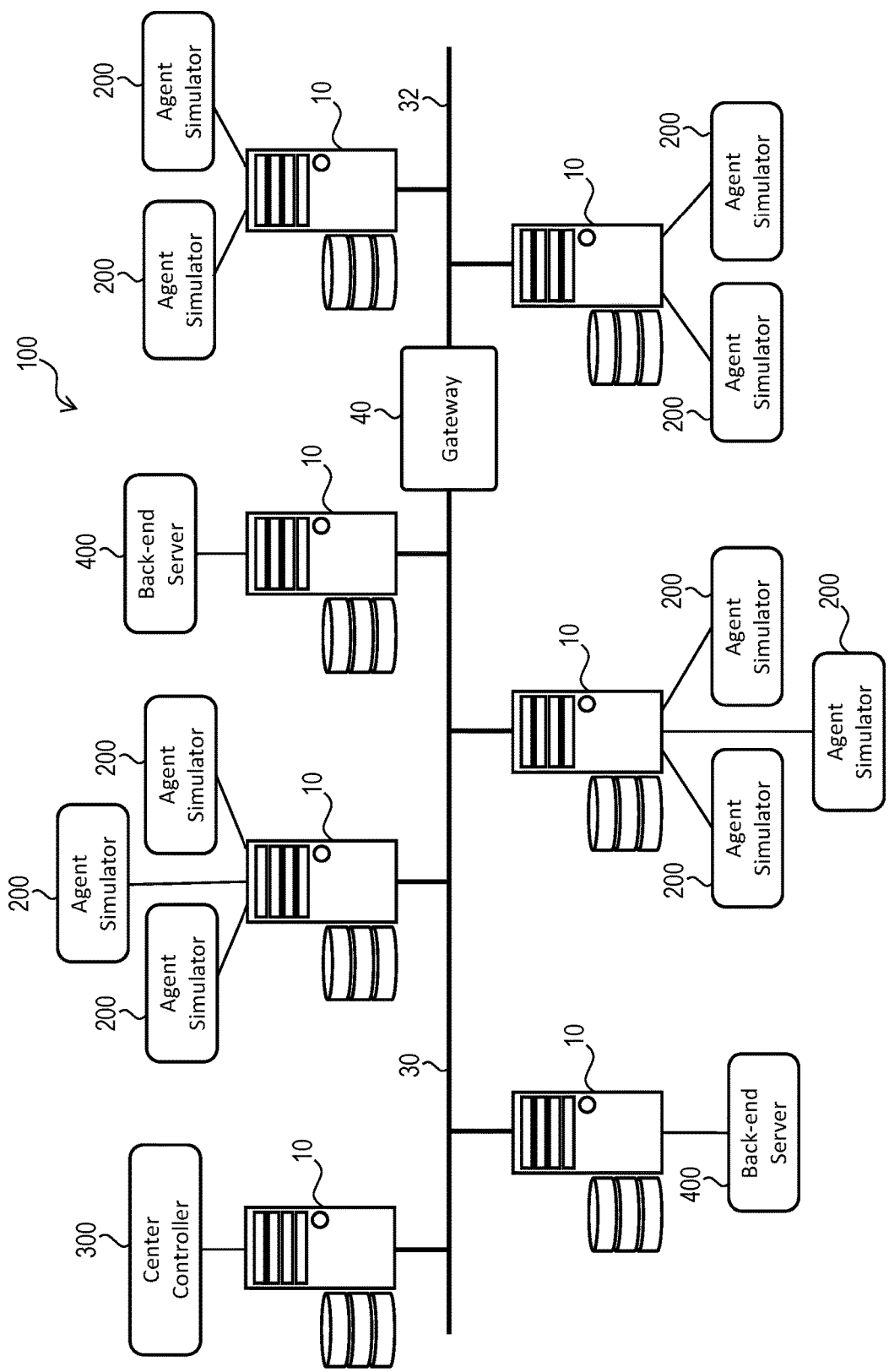
FIG. 18 is a diagram illustrating an example of a physical configuration of the multi-agent simulation system according to the embodiment of the present disclosure.

The physical configuration of the MAS system 100 will be described. FIG. 18 is a diagram illustrating an example of a physical configuration of the MAS system 100. The MAS system 100 may comprise, for example, a plurality of computers 10 arranged on the same subnet 30. Further, by connecting the subnet 30 and another subnet 32 by a gateway 40, the MAS system 100 can be expanded to a plurality of computers 10 located on the subnet 32.

In the example shown in FIG. 18, the center controller 300, which is software, is installed on one computer 10. However, the functions of the center controller 300 may be distributed to a plurality of computers 10.

The MAS system 100 includes a plurality of back-end servers 400. In the example shown in FIG. 18, each back-end server 400 is installed on a separate computer 10. However, the function of the back-end server 400 may be distributed to a plurality of computers 10. Further, a plurality of back-end servers 400 may be installed on one computer 10 by a virtualization technique for dividing one server into a plurality of servers.

In the example shown in FIG. 18, a plurality of agent simulators 200 are installed on one computer 10. Virtualization technology can be used as a method of independently operating a plurality of agent simulators 200 on a single computer 10. The virtualization technology can be a virtual machine or a container virtualization. A plurality of agent simulators 200 of the same type may be installed on one computer 10, or a plurality of agent simulators 200 of different types may be installed. Note that only one agent simulator 200 may be installed on one computer 10.

As described above, the MAS system 100 employs parallel distributed processing using a plurality of computers 10 rather than processing by a single computer. This prevents the computing power from limiting the number of agents appearing in the virtual world 2 and the computing power from limiting the number of services provided in the virtual world 2. That is, according to the MAS system 100, a large-scale simulation by parallel distributed processing is possible.

6. Other Embodiment

An observation agent may be provided to observe the virtual world 2 from outside. The observation agent may be, for example, a non-moving object, such as a street-corner camera, or a moving object, such as a drone with a camera. By connecting the output of the physical engine of the observation agent to the monitor, the virtual world 2 can be observed from the viewpoint of the observation agent.

In the above-described embodiment, although the remainder time rate itself is used as an index value for controlling the speed ratio, other numeric values as long as it is a value corresponding to the remainder time rate can also be an index value. For example, even a value obtained by subtracting the remainder time rate from 1 can be used as an index value.

What is claimed is:

1. A system for simulating a target virtual world using a plurality of agents interacting with each other in a computer network environment, comprising:
a plurality of agent simulators provided for each of the plurality of agents and configured to simulate a state of each of the plurality of agents while causing the plurality of agents to interact with each other in the target virtual world by exchange of messages; and
a center controller configured to control a speed ratio of a flow of time in the target virtual world to a flow of time in a real world, wherein:
each of the plurality of agent simulators is configured to calculate an index value corresponding to a remainder time rate, the remainder time rate being a rate of a remainder time to an update time interval for updating a state of a target agent to be simulated, the remainder time being a time between the update time interval and a processing time for updating processing; and
the center controller is configured to control the speed ratio based on the index value calculated by each of the plurality of agent simulators.

2. The system according to claim 1, wherein the center controller is configured to control the speed ratio based on an index value having a lowest corresponding remainder time rate among index values calculated by the plurality of agent simulators.

3. The system according to claim 1, wherein the center controller is configured to increase the speed ratio in a case where the index value corresponds to a remainder time rate equal to or greater than a first threshold value.

4. The system according to claim 3, wherein the center controller is configured to increase the speed ratio more as a remainder time rate that the index value corresponds to is higher.

5. The system according to claim 3, wherein the center controller is configured to decrease the speed ratio in a case where the index value corresponds to a remainder time rate equal to or less than a second threshold value that is lower than the first threshold value and greater than zero.

6. The system according to claim 5, wherein the center controller is configured to decrease the speed ratio more as a remainder time rate that the index value corresponds to is closer to zero.

7. The system according to claim 1, wherein each of the plurality of agent simulators is configured to calculate, as the index value, a ratio of a remainder time from an acquisition time of a last received message among messages from other agent simulators necessary for a next update of the state of the target agent to a next update time of the state of the target agent to the update time interval.

8. A method for simulating a target virtual world using a plurality of virtual agents interacting with each other in a computer network environment, comprising:
exchanging messages between a plurality of agent simulators provided for each of the plurality of agents;
simulating a state of each of the plurality of agents while causing the plurality of agents to interact with each other by exchange of the messages;
controlling a speed ratio of a flow of time in the target virtual world to a flow of time in a real world by a center controller; and
causing each of the plurality of agent simulators to calculate an index value corresponding to a remainder time rate, the remainder time rate being a rate of a remainder time to an update time interval for updating a state of a target agent to be simulated, the remainder time being a time between the update time interval and a processing time for updating processing,
wherein the controlling the speed ratio includes controlling the speed ratio based on the index value calculated by each of the plurality of agent simulators.

9. The method according to claim 8, wherein the controlling the speed ratio includes controlling the speed ratio based on an index value having a lowest corresponding remainder time rate among index values calculated by the plurality of agent simulators.

10. The method according to claim 8, wherein the controlling the speed ratio includes increasing the speed ratio in a case where the index value corresponds to a remainder time rate equal to or greater than a first threshold value.

11. The method according to claim 10, wherein the controlling the speed ratio includes increasing the speed ratio more as a remainder time rate that the index value corresponds to is higher.

12. The method according to claim 10, wherein the controlling the speed ratio includes decreasing the speed ratio in a case where the index value corresponds to a remainder time rate equal to or less than a second threshold value that is lower than the first threshold value and greater than zero.

13. The method according to claim 12, wherein the controlling the speed ratio includes decreasing the speed ratio more as a remainder time rate that the index value corresponds to is closer to zero.

14. The method according to claim 8, wherein the causing each of the plurality of agent simulators to calculate the index value includes causing each of the plurality of agent simulators to calculate, as the index value, a ratio of a remainder time from an acquisition time of a last received message among messages from other agent simulators necessary for a next update of the state of the target agent to a next update time of the state of the target agent to the update time interval.

* * * * *